US008838366B2

(12) United States Patent
Suyama et al.

(10) Patent No.: US 8,838,366 B2
(45) Date of Patent: Sep. 16, 2014

(54) HYBRID DRIVE APPARATUS

(75) Inventors: Daiki Suyama, Okazaki (JP); Toshihiko Kamiya, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 114 days.

(21) Appl. No.: 13/522,426

(22) PCT Filed: Feb. 16, 2011

(86) PCT No.: PCT/JP2011/053887
§ 371 (c)(1),
(2), (4) Date: Jul. 16, 2012

(87) PCT Pub. No.: WO2011/108407
PCT Pub. Date: Sep. 9, 2011

(65) Prior Publication Data
US 2012/0323425 A1    Dec. 20, 2012

(30) Foreign Application Priority Data

Mar. 5, 2010   (JP) .................................. 2010-049193

(51) Int. Cl.
*B60W 10/02*    (2006.01)
*B60W 10/04*    (2006.01)

(52) U.S. Cl.
USPC ................... 701/105; 701/67; 701/68; 477/8; 477/168; 477/174; 477/180

(58) Field of Classification Search
USPC ........ 701/67, 68, 86, 105; 477/3, 5, 6, 8, 168, 477/174, 180
See application file for complete search history.

(56) References Cited

U.S. PATENT DOCUMENTS 3,308,686 A    3/1967    Magg et al.
4,466,502 A    8/1984    Sakai
(Continued)

FOREIGN PATENT DOCUMENTS

CN    1340009 A    3/2002
CN    101018687 A    8/2007
(Continued)

OTHER PUBLICATIONS

International Search Report issued in Application No. PCT/JP2011/053887; Dated May 11, 2011.
(Continued)

*Primary Examiner* — Calvin Cheung
*Assistant Examiner* — Thomas Ingram
(74) *Attorney, Agent, or Firm* — Oliff PLC

(57) ABSTRACT

A hybrid drive apparatus includes an input member that is drivingly connected to a rotary electric machine and drivingly connected via an input clutch to an internal combustion engine, an output member that is drivingly connected to the input member and transmits rotation of the input member to wheels, and a control device that controls the rotary electric machine. The control device is capable of performing valve opening/closing phase control that advances or retards opening/closing phases of valve elements provided in the internal combustion engine via a valve opening/closing phase adjusting mechanism and, with the internal combustion engine in a stopped state before starting a vehicle, advances the opening/closing phases of the valve elements to bring the opening/closing phases of the valve elements into an advanced phase state relative to predetermined reference phases, thus starting the vehicle with torque of the rotary electric machine in the advanced phase state.

10 Claims, 10 Drawing Sheets

(56) References Cited

U.S. PATENT DOCUMENTS

| | | | |
|---|---|---|---|
| 6,092,985 | A | 7/2000 | Winkam |
| 6,258,001 | B1 | 7/2001 | Wakuta et al. |
| 6,340,339 | B1 | 1/2002 | Tabata et al. |
| 6,341,584 | B1 | 1/2002 | Itoyama et al. |
| 6,492,742 | B1 | 12/2002 | Fujikawa et al. |
| 6,524,216 | B2 | 2/2003 | Suzuki et al. |
| 6,533,692 | B1 | 3/2003 | Bowen |
| 6,585,066 | B1 | 7/2003 | Koneda et al. |
| 6,590,306 | B2 | 7/2003 | Terada |
| 6,679,796 | B2 | 1/2004 | Sugano |
| 6,719,076 | B1 | 4/2004 | Tabata et al. |
| 6,863,140 | B2 | 3/2005 | Noreikat et al. |
| 6,935,450 | B1 | 8/2005 | Tsuzuki et al. |
| 7,059,443 | B2 | 6/2006 | Kira |
| 7,086,978 | B2 | 8/2006 | Aikawa et al. |
| 7,114,484 | B2 | 10/2006 | Kaita et al. |
| 7,114,604 | B2 | 10/2006 | Masuya |
| 7,396,308 | B2 | 7/2008 | Tabata et al. |
| 7,489,114 | B2 | 2/2009 | Nomura et al. |
| 7,810,592 | B2 | 10/2010 | Klemen et al. |
| 7,954,578 | B2 | 6/2011 | Kim et al. |
| 8,155,848 | B2 | 4/2012 | Kobayashi et al. |
| 8,322,504 | B2 | 12/2012 | Mueller et al. |
| 8,333,680 | B2 | 12/2012 | Kasuya et al. |
| 8,360,186 | B2 | 1/2013 | Yamamoto et al. |
| 8,590,649 | B2 | 11/2013 | Osawa et al. |
| 8,602,940 | B2 | 12/2013 | Kuwahara et al. |
| 8,636,090 | B2 | 1/2014 | Nomura et al. |
| 2002/0043883 | A1 | 4/2002 | Shimizu |
| 2003/0127262 | A1 | 7/2003 | Noreikat et al. |
| 2004/0029677 | A1* | 2/2004 | Mori et al. ............... 477/3 |
| 2004/0154846 | A1 | 8/2004 | Kira |
| 2005/0066933 | A1 | 3/2005 | Kaita et al. |
| 2005/0079942 | A1* | 4/2005 | Bauknecht et al. ......... 475/5 |
| 2006/0100060 | A1 | 5/2006 | Kraska et al. |
| 2006/0272869 | A1* | 12/2006 | Hidaka et al. .......... 180/65.2 |
| 2006/0289209 | A1 | 12/2006 | Grosspietsch et al. |
| 2007/0108857 | A1 | 5/2007 | Nomura et al. |
| 2007/0175723 | A1 | 8/2007 | Blessing et al. |
| 2007/0175726 | A1 | 8/2007 | Combes et al. |
| 2008/0047799 | A1 | 2/2008 | Combes et al. |
| 2009/0054203 | A1 | 2/2009 | Heeke |
| 2009/0100965 | A1 | 4/2009 | Sanji et al. |
| 2009/0271079 | A1 | 10/2009 | Kobayashi et al. |
| 2009/0283344 | A1 | 11/2009 | Arnold et al. |
| 2010/0038201 | A1 | 2/2010 | Mueller et al. |
| 2010/0062899 | A1* | 3/2010 | Engelmann et al. ......... 477/86 |
| 2010/0105518 | A1 | 4/2010 | Kasuya et al. |
| 2010/0132504 | A1 | 6/2010 | Miller et al. |
| 2010/0236856 | A1 | 9/2010 | Nomura et al. |
| 2011/0118079 | A1 | 5/2011 | Mueller et al. |
| 2011/0121692 | A1 | 5/2011 | Iwase et al. |
| 2011/0240430 | A1 | 10/2011 | Iwase et al. |
| 2011/0240431 | A1 | 10/2011 | Iwase et al. |
| 2012/0217830 | A1 | 8/2012 | Iwase et al. |
| 2012/0247911 | A1 | 10/2012 | Noda et al. |
| 2012/0258838 | A1 | 10/2012 | Hartz et al. |
| 2012/0318630 | A1 | 12/2012 | Iwase et al. |
| 2012/0319514 | A1 | 12/2012 | Iwase et al. |
| 2013/0008284 | A1 | 1/2013 | Sada et al. |
| 2013/0009522 | A1 | 1/2013 | Ozaki et al. |
| 2013/0057117 | A1 | 3/2013 | Suzuki et al. |

FOREIGN PATENT DOCUMENTS

| | | |
|---|---|---|
| DE | 10 2004 033 141 A1 | 2/2006 |
| DE | 10 2009 022 272 A1 | 12/2009 |
| EP | 1 800 929 A2 | 6/2007 |
| FR | 2 830 589 A1 | 4/2003 |
| JP | U 3-69748 | 7/1991 |
| JP | B2-03-072507 | 11/1991 |
| JP | A 7-217724 | 8/1995 |
| JP | A-08-277859 | 10/1996 |
| JP | B2 3080612 | 8/2000 |
| JP | A-2002-220078 | 8/2002 |
| JP | A 2005-212494 | 8/2005 |
| JP | A-2006-137406 | 6/2006 |
| JP | A-2007-015810 | 1/2007 |
| JP | A-2007-071083 | 3/2007 |
| JP | A 2007-118717 | 5/2007 |
| JP | A 2009-1127 | 1/2009 |
| JP | A 2009-001165 | 1/2009 |
| JP | A-2009-11010 | 1/2009 |
| JP | A 2009-101730 | 5/2009 |
| JP | A-2009-262659 | 11/2009 |
| WO | WO 2008/092426 A2 | 8/2008 |
| WO | WO 2010/017786 A1 | 2/2010 |

OTHER PUBLICATIONS

Aug. 2, 2013 Office Action issued in U.S. Appl. No. 13/522,597 issued in the name of Suyama.
Aug. 30, 2013 Notice of Allowance issued in U.S. Appl. No. 12/926,446.
Nov. 7, 2013 Notification of Reason(s) for Refusal issued in Japanese Patent Application No. 2010-246515 (partial translation).
Oct. 17, 2013 Office Action issued in U.S. Appl. No. 12/926,447.
May 6, 2011 Search Report issued in International Patent Application No. PCT/JP2011/053886.
Jul. 8, 2011 Search Report issued in International Patent Application No. PCT/JP2011/055720.
May 31, 2011 Search Report issued in International Patent Application No. PCT/JP2011/055721.
Feb. 8, 2011 Search Report issued in International Patent Application No. PCT/JP2010/070714 (with translation).
Feb. 8, 2011 Search Report issued in International Patent Application No. PCT/JP2010/070715 (with translation).
Feb. 8, 2011 Search Report issued in International Patent Application No. PCT/JP2010/070716 (with translation).
Feb. 8, 2011 Search Report issued in International Patent Application No. PCT/JP2010/070717 (with translation).
Dec. 9, 2013 Corrected Notice of Allowability issued in U.S. Appl. No. 12/926,446.
Dec. 26, 2012 Office Action issued in U.S. Appl. No. 13/522,135.
Feb. 4, 2013 Office Action issued in U.S. Appl. No. 12/926,446.
Nice et al., "How Clutches Work," HowStuffWorks.com, Oct. 16, 2007, <http://auto.howstuffworks.com/clutch.htm>.
Office Action issued in U.S. Appl. No. 13/502,909 dated Mar. 6, 2014.
Office Action issued in U.S. Appl. No. 13/522,597 dated Mar. 7, 2014.
Jun. 27, 2013 Notification of Reason(s) for Refusal issued in Japanese Patent Application No. 2010-246511 (partial translation only).
Apr. 26, 2013 Notice of Allowance issued in U.S. Appl. No. 12/926,446.
U.S. Appl. No. 12/948,297, filed Nov. 17, 2010 in the name of Mikio Iwase et al.
U.S. Appl. No. 13/522,597, filed Jul. 17, 2012 in the name of Daiki Suyama et al.
U.S. Appl. No. 13/522,135, filed Jul. 13, 2012 in the name of Mikio Iwase et al.
U.S. Appl. No. 12/926,446, filed Nov. 18, 2010 in the name of Mikio Iwase et al.
U.S. Appl. No. 13/502,909, filed Apr. 19, 2012 in the name of Mikio Iwase et al.
U.S. Appl. No. 12/926,447, filed Nov. 18, 2010 in the name of Mikio Iwase et al.
U.S. Appl. No. 13/522,651, filed Jul. 17, 2012 in the name of Mikio Iwase et al.
Mar. 18, 2013 Office Action issued in U.S. Appl. No. 12/926,447.
Mar. 28, 2013 Notification of Reasons for Refusal issued in Japanese Patent Application No. 2010-049193 (partial translation).
May 6, 2014 Notice of Allowance issued in U.S. Appl. No. 12/948,297.
May 6, 2014 Office Action issued in U.S. Appl. No. 12/926,447.
Jun. 22, 2014 Notice of Allowance issued in U.S. Appl. No. 13/502,909.

* cited by examiner

|  | C1 | C2 | C3 | B1 | B2 | F1 |
|---|---|---|---|---|---|---|
| 1st | ● |  |  |  |  | ▲ |
| 2nd | ● |  |  | ● |  |  |
| 3rd | ● |  | ● |  |  |  |
| 4th | ● | ● |  |  |  |  |
| 5th |  | ● | ● |  |  |  |
| 6th |  | ● |  | ● |  |  |
| Rev |  |  | ● |  | ● |  |

HYBRID DRIVE APPARATUS

INCORPORATION BY REFERENCE

The disclosure of Japanese Patent Application No. 2010-049193 filed on Mar. 5, 2010, including the specification, drawings and abstract is incorporated herein by reference in its entirety.

BACKGROUND OF THE INVENTION

The present invention relates to a hybrid drive apparatus provided with an input member that is drivingly connected to a rotary electric machine and drivingly connected via an input clutch to an internal combustion engine, an output member that is drivingly connected to the input member and transmits rotation of the input member to wheels, and a control device that controls at least the rotary electric machine.

DESCRIPTION OF THE RELATED ART

As a hybrid drive apparatus provided with an input member that is drivingly connected to a rotary electric machine and drivingly connected via an input clutch to an internal combustion engine, an output member that is drivingly connected to the input member and transmits rotation of the input member to wheels, and a control device that controls at least the rotary electric machine, for example, an apparatus disclosed in Japanese Patent Application Publication No. JP-A-2006-137406 described below has already been known. This hybrid drive apparatus is structured as a so-called one-motor parallel type hybrid drive apparatus, being provided with the input clutch (clutch mechanism 16) on a power transmission path between the internal combustion engine (engine) and the rotary electric machine (motor). Here, the input clutch provided in the apparatus of Japanese Patent Application Publication No. JP-A-2006-137406 is structured, in a configuration thereof, as a so-called normally closed type clutch (refer to FIG. 1, etc. in Japanese Patent Application Publication No. JP-A-2006-137406).

Here, the input clutch provided in the apparatus of Japanese Patent Application Publication No. JP-A-2006-137406 is structured such that a plurality of friction materials (friction elements) are pressed against each other by a pressing force of an elastic member (plate spring 17) provided in the input clutch, which is thus brought into an engaged state in the steady state where the clutch is not operated. The hybrid drive apparatus of Japanese Patent Application Publication No. JP-A-2006-137406 has an independently operating electric oil pump, in addition to a mechanical oil pump provided inside the hybrid drive apparatus. The elastic member is separated from the plurality of friction materials by a first piston 20 and a second piston 22 that are operated by hydraulic pressure of oil discharged from the electric oil pump, thereby disengaging the input clutch. Then, in the disengaged state of the input clutch, a vehicle can be started in an electric drive mode. As a result, drag of the internal combustion engine can be avoided when starting the vehicle in the electric drive mode, thereby enabling improvement of energy efficiency.

SUMMARY OF THE INVENTION

However, manufacturing cost significantly increases when the apparatus is separately provided with a hydraulic pressure source such as the electric oil pump for disengaging the input clutch as in the apparatus of Japanese Patent Application Publication No. JP-A-2006-137406. Therefore, in order to reduce cost, it can be considered to adopt, for example, a structure in which a mechanical oil pump driven by the input member is provided, and the input member is driven by torque of the rotary electric machine while the normally closed type input clutch is engaged, thus disengaging the input clutch by hydraulic pressure of oil discharged from the oil pump driven by the input member. However, in this structure, after the rotary electric machine has started to rotate, until a required hydraulic pressure is obtained by the oil pump, a part of the torque of the rotary electric machine is transmitted to the internal combustion engine side via the input clutch. In this case, if a torque transmittable by the input clutch is greater than a driven torque of the internal combustion engine while the input clutch is engaged, the internal combustion engine is dragged to be rotated by the torque transmitted to the internal combustion engine via the input clutch. If the internal combustion engine rotates in this way, when the vehicle starts in the electric drive mode, driveability (driving comfort and ease of driving) may deteriorate due to occurrence of vibration, and so forth.

Therefore, it is desired to realize a hybrid drive apparatus that can favorably maintain driveability when starting a vehicle in the electric drive mode.

A hybrid drive apparatus according to the present invention including an input member that is drivingly connected to a rotary electric machine and drivingly connected via an input clutch to an internal combustion engine, an output member that is drivingly connected to the input member and transmits rotation of the input member to a wheel, and a control device that controls at least the rotary electric machine has a structure characterized in that: the input clutch has a plurality of friction materials and an elastic member pressing the plurality of friction materials against each other at a predetermined urging force, and is structured so as to be capable of transmitting torque by the urging force of the elastic member; and in that the control device is capable of performing valve opening/closing phase control for advancing or retarding opening/closing phases of valve elements provided in the internal combustion engine via a valve opening/closing phase adjusting mechanism, and with the internal combustion engine in a stopped state before starting a vehicle, the control device advances the opening/closing phases of the valve elements to bring the opening/closing phases of the valve elements into an advanced phase state relative to predetermined reference phases, thus starting the vehicle with torque of the rotary electric machine in the advanced phase state.

Note that, in the present application, the term "drivingly connected" refers to a state in which two rotational elements are connected so as to be capable of transmitting a driving force, and is used as a concept including a state in which the two rotational elements are connected so as to rotate as a unit, or a state in which the two rotational elements are connected so as to be capable of transmitting the driving force via one or two or more transmitting members.

Note also that, in the present application, the term "rotary electric machine" is used as a concept including all of a motor (electric motor), a generator (electric generator), and a motor-generator that serves as both a motor and a generator depending on the necessity.

In the present structure thus characterized, the input clutch has the plurality of friction materials and the elastic member pressing the plurality of friction materials against each other at the predetermined urging force, and is structured so as to be capable of transmitting torque by the urging force of the elastic member. Therefore, when starting the vehicle with the torque of the rotary electric machine, a part of the torque of the rotary electric machine is also transmitted to the internal combustion engine via the input clutch. In this case, based on the relation in magnitude between the torque transmittable by the input clutch with the urging force of the elastic member and the driven torque of the internal combustion engine, it is determined whether the internal combustion engine is dragged to be rotated by the torque transmitted to the internal combustion engine via the input clutch, or the internal combustion engine in the stopped state still remains in the stopped state.

In such a situation, according to the structure characterized as described above, the control device brings the opening/closing phases of the valve elements provided in the internal combustion engine into the predetermined advanced phase state, and then starts the vehicle with the torque of the rotary electric machine. By bringing the phase into the advanced phase state, a pressure in a combustion chamber provided inside the internal combustion engine can be increased during compression operation in the combustion chamber. Therefore, the driven torque of the internal combustion engine can be increased, thereby making it easy to maintain the driven torque of the internal combustion engine to be larger than the torque transmittable by the input clutch. As a result, the internal combustion engine can be suppressed from being dragged to be rotated by the torque transmitted to the internal combustion engine via the input clutch, when starting the vehicle in an electric drive mode.

Consequently, it is possible to provide the hybrid drive apparatus that can favorably maintain driveability when starting the vehicle in the electric drive mode.

Note that it is preferable to determine the "predetermined reference phases" for the opening/closing phases of the valve elements provided in the internal combustion engine to be opening/closing phases of the valve elements when starting the internal combustion engine. For example, in the hybrid drive apparatus to which the present application applies, the predetermined reference phases can be most retarded phases in predetermined movable ranges that are generally set as opening/closing phases for achieving a so-called decompression function for purposes such as suppressing vibration when starting the internal combustion engine. However, the present invention is not limited to this, any phase between the most retarded phase and a most advanced phase (except the most advanced phase) can be the "predetermined reference phase."

Note also that the term "driven torque" of the internal combustion engine refers to a torque required to be supplied from outside in order to rotationally drive the output member of the internal combustion engine.

Here, it is preferable that the hybrid drive apparatus according to the present invention is structured such that the magnitude of the urging force of the elastic member and the opening/closing phases of the valve elements in the advanced phase state are set so that the torque transmittable by the input clutch with the urging force of the elastic member is smaller than the driven torque of the internal combustion engine in the advanced phase state.

According to this structure, the state can be surely maintained in which the driven torque of the internal combustion engine is greater than the torque transmittable by the input clutch, when starting the vehicle in the electric drive mode. Therefore, the internal combustion engine can almost surely be prevented from being dragged to be rotated by the torque transmitted to the internal combustion engine via the input clutch.

It is also preferable that the hybrid drive apparatus according to the present invention further includes an oil pump driven by the input member, and in the hybrid drive apparatus, the input clutch has a piston that presses the plurality of friction materials against each other by being operated by the urging force of the elastic member and also by hydraulic pressure, and is structured such that a circulating oil pressure is supplied to an opposite-to-cylinder side of the piston; and the control device, when detecting a start preliminary operation by a driver while the vehicle is stopped with the internal combustion engine in the stopped state, rotates the rotary electric machine to cause the oil pump to produce the circulating oil pressure that disengages the input clutch by canceling out the urging force of the elastic member, and the control device retards the opening/closing phases of the valve elements after disengaging the input clutch.

According to this structure, when the start preliminary operation by the driver is detected while the vehicle is stopped with the internal combustion engine in the stopped state, the control device rotates the rotary electric machine to drive the oil pump via the input member. The oil pump thus driven produces the circulating oil pressure, which is supplied to the opposite-to-cylinder side of the piston provided in the input clutch. Because the circulating oil pressure supplied to the opposite-to-cylinder side of the piston of the input clutch disengages the input clutch by canceling out the urging force of the elastic member in the pressing direction against the piston, the structure can be achieved in which the internal combustion engine can be cut off from the rotary electric machine by using the oil pump driven by the input member. In addition, because it is not necessary to separately provide another hydraulic pressure source such as an electric oil pump, manufacturing cost can be reduced.

Moreover, by retarding the opening/closing phases of the valve elements after disengaging the input clutch, the internal combustion engine in the stopped state can appropriately be made ready for the next start. That is, by retarding the opening/closing phases of the valve elements, the pressure in the combustion chamber of the internal combustion engine can be reduced during compression operation in the combustion chamber. As a result, pressure fluctuation in the combustion chamber can be suppressed, thereby suppressing occurrence of vibration from the internal combustion engine when starting the internal combustion engine in the stopped state. Consequently, the driveability can be favorably maintained when starting the internal combustion engine. In addition, an amount of energy required to start the internal combustion engine can be reduced.

In this case, it is preferable that the hybrid drive apparatus according to the present invention is structured so as to be capable of obtaining information from at least one of a stroke position detecting portion that detects a stroke position of a brake pedal included in a brake mechanism provided in the vehicle and an operation pressure detecting portion that detects an operation pressure of the brake pedal, and structured such that the control device detects the start preliminary operation based on at least one of the stroke position and the operation pressure.

In the state in which the vehicle is stopped, the brake pedal included in the brake mechanism provided in the vehicle is generally depressed by a large amount, and the depressed amount of the brake pedal is to be reduced before starting the vehicle. With the reduction in the depressed amount of the brake pedal, each of the stroke position and the operation pressure of the brake pedal also changes.

According to this structure, based on at least one of the stroke position of the brake pedal detected by the stroke position detecting portion and the operation pressure of the brake pedal detected by the operation pressure detecting portion, the reduction in the depressed amount of the brake pedal can be detected, thereby enabling appropriate detection of the start preliminary operation.

It is also preferable that the hybrid drive apparatus according to the present invention is structured such that a disengagement threshold value is set in advance as a lower limit value of a rotational speed of the rotary electric machine required to disengage the input clutch by the circulating oil pressure, and the control device retards the opening/closing phases of the valve elements when a predetermined delay time has further passed after the rotational speed of the rotary electric machine has increased to reach the disengagement threshold value.

According to this structure, when the rotational speed of the rotary electric machine has increased to reach the disengagement threshold value, it can be judged that the input clutch has been disengaged. However, the timings of the those events do not necessarily coincide completely with each other due to variations in the amount of the urging force of the elastic member, the circulating oil pressure, and so forth. For example, there may be a case in which the input clutch is not actually completely disengaged but partially capable of transmitting torque with the urging force of the elastic member, even though the rotational speed of the rotary electric machine has increased to reach the disengagement threshold value. If the opening/closing phases of the valve elements are retarded in that state, the driven torque of the internal combustion engine is reduced to cause the internal combustion engine to be easily dragged, thereby generating a possibility of worsening the driveability. Therefore, by waiting until the predetermined delay time further passes after the rotational speed of the rotary electric machine has increased to reach the disengagement threshold value as described above, the opening/closing phases of the valve elements can be retarded after surely disengaging the input clutch. Consequently, the driveability can be favorably maintained, both when starting the vehicle in the electric drive mode and when starting the internal combustion engine.

It is also preferable that the hybrid drive apparatus according to the present invention is structured such that a disengagement threshold value is set in advance as a lower limit value of the rotational speed of the rotary electric machine required to disengage the input clutch by the circulating oil pressure, and the control device advances the opening/closing phases of the valve elements to bring the opening/closing phases of the valve elements into the advanced phase state when the rotational speed of the rotary electric machine has decreased to reach the disengagement threshold value, with the internal combustion engine in the stopped state before stopping the vehicle.

According to this structure, when the rotational speed of the rotary electric machine has decreased to reach the disengagement threshold value, the input clutch can be judged, as a possibility, to have become capable of transmitting torque with the urging force of the elastic member. Also in this case, the timings of those events do not necessarily coincide completely with each other. However, for example, in the case in which the input clutch actually maintains the disengaged state even though the rotational speed of the rotary electric machine has decreased to reach the disengagement threshold value, no particular problem occurs even if, in that state, the opening/closing phases of the valve elements are immediately advanced to be brought into the advanced phase state. That is, because the input clutch is in the disengaged state, the torque of the rotary electric machine is not transmitted to the internal combustion engine, even if, for example, a vehicle acceleration request is issued in that state. Therefore, no vibration is generated from the internal combustion engine even if the opening/closing phases of the valve elements are advanced. Consequently, by promptly advancing the opening/closing phases of the valve elements to bring the opening/closing phases of the valve elements into the advanced phase state when the rotational speed of the rotary electric machine has decreased to reach the disengagement threshold value as described above, the vehicle can appropriately be made ready for the next start in the electric drive mode.

It is also preferable that the hybrid drive apparatus according to the present invention is structured such that the magnitude of the urging force of the elastic member in the state of no hydraulic pressure being supplied to the input clutch is set in advance to a magnitude within a range in which: the internal combustion engine in the stopped state is capable of still remaining in the stopped state even if the torque of the rotary electric machine is transmitted via the input clutch to the internal combustion engine in a most retarded phase state in which the opening/closing phases of the valve elements are fully retarded within predetermined movable ranges; and the torque of the internal combustion engine is capable of being transmitted via the input clutch to the oil pump to drive the oil pump from a stopped state.

According to this structure, even in the most retarded phase state in which the driven torque of the internal combustion engine is at a minimum, the internal combustion engine in the stopped state can surely remain still in the stopped state, when the torque of the rotary electric machine is transmitted to the internal combustion engine via the input clutch in which the friction materials are pressed against each other by the urging force of the elastic member. Therefore, in the advanced phase state in which the driven torque of the internal combustion engine is larger, the internal combustion engine in the stopped state can further surely remain still in the stopped state, when the torque of the rotary electric machine is transmitted to the internal combustion engine via the input clutch in which the friction materials are pressed against each other by the urging force of the elastic member. Consequently, when starting the vehicle in the electric drive mode, the internal combustion engine can be more surely suppressed from being dragged by rotation of the rotary electric machine, thereby enabling suppression of the occurrence of vibration, etc. associated with rotation of the internal combustion engine so as to suppress the driveability from deteriorating.

In addition, the oil pump can surely be driven from the stopped state by transmitting the torque of the internal combustion engine via the input clutch to the oil pump. Therefore, even if the rotary electric machine is in failure, the oil pump can produce hydraulic pressure, and the input clutch can be engaged by the hydraulic pressure thus produced. Consequently, the vehicle can surely be started and driven.

DETAILED DESCRIPTION OF THE EMBODIMENTS

An embodiment of a hybrid drive apparatus according to the present invention will be described with reference to the accompanying drawings. A hybrid drive apparatus 1 is a drive apparatus for a hybrid vehicle that uses, as a source of vehicle driving force, one or both of an internal combustion engine 11 and a rotary electric machine 12. The hybrid drive apparatus 1 is structured as a so-called one-motor parallel type hybrid drive apparatus.

Figure 1:
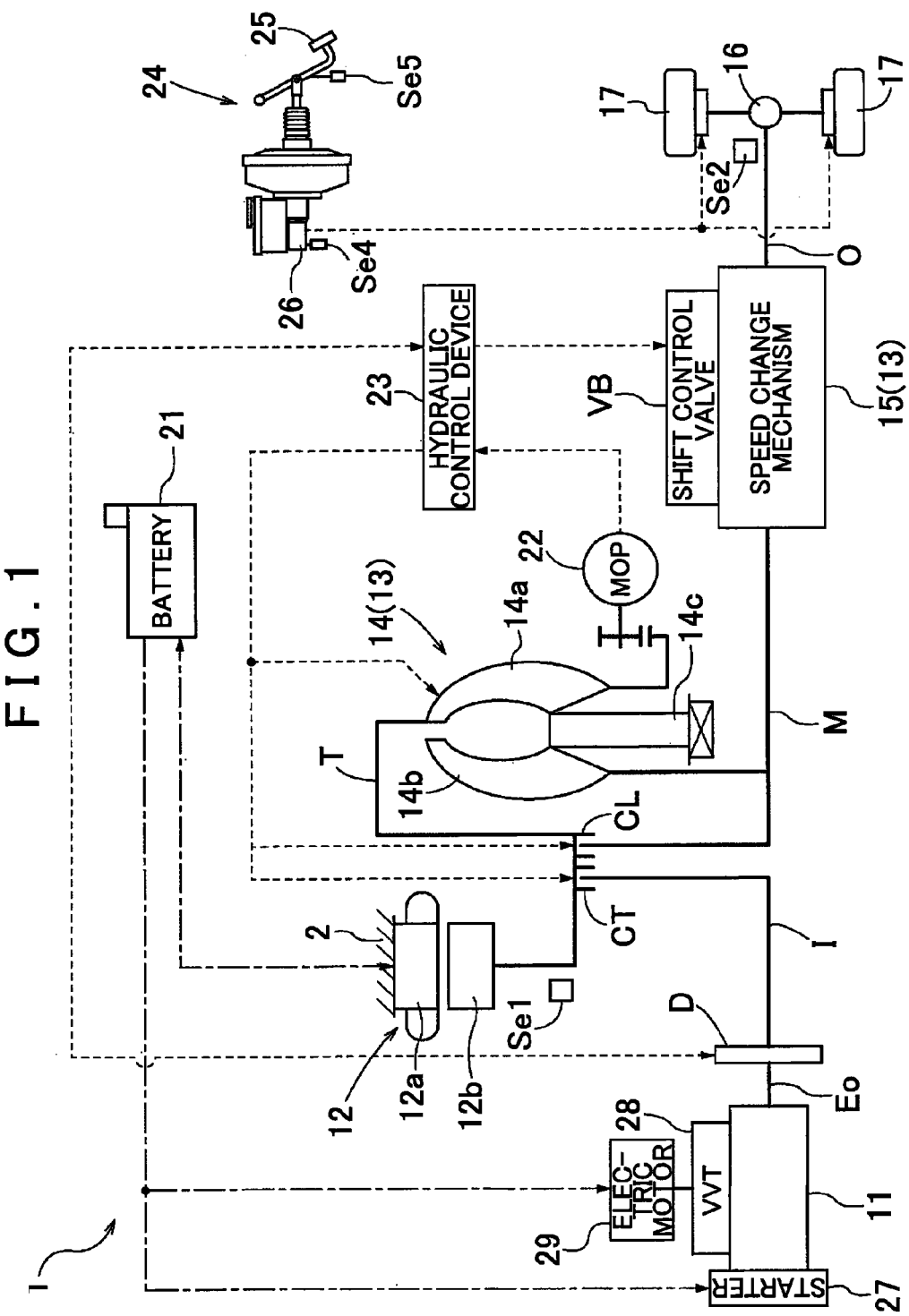
FIG. 1 is a schematic diagram showing a structure of a hybrid drive apparatus according to a present embodiment.

As shown in FIG. 1, the hybrid drive apparatus 1 according to the present embodiment is provided with a drive transmission member T that is drivingly connected to the rotary electric machine 12 and drivingly connected via an input clutch CT to the internal combustion engine 11, a transmission device 13 that transmits rotation of the drive transmission member T to an output shaft O at a changed speed, and a mechanical oil pump 22 that is driven by the drive transmission member T. The hybrid drive apparatus 1 is also provided with a control unit 30 (refer to FIG. 5) that controls at least the rotary electric machine 12. In the structure as described above, the hybrid drive apparatus 1 according to the present embodiment is characterized in the mode of torque transmission in the input clutch CT and in the content of controlling an opening/closing phase of an intake valve of the internal combustion engine 11 at the time of starting the vehicle.

That is, the input clutch CT has a plurality of friction materials 45 and a coned disk spring 44 serving as an elastic member pressing the friction materials 45 against each other at a predetermined urging force (refer to FIG. 4), and is structured so as to be capable of transmitting torque with the urging force of the coned disk spring 44. With the internal combustion engine 11 in the stopped state before starting the vehicle, the control unit 30 advances, via a valve opening/closing phase adjusting mechanism 28, the opening/closing phases of the intake valve and an exhaust valve provided in the internal combustion engine 11 to bring them into an advanced phase state relative to predetermined reference phases, thus starting the vehicle with torque of the rotary electric machine 12 in the advanced phase state. By combining these characteristic structures, the hybrid drive apparatus 1 is realized that can favorably maintain the driveability when starting the vehicle in an electric drive mode. The hybrid drive apparatus 1 according to the present embodiment will be described below in detail.

1. Overall Structure of Hybrid Drive Apparatus

First of all, an overall structure of the hybrid drive apparatus 1 according to the present embodiment will be described.

As shown in FIG. 1, the hybrid drive apparatus 1 is provided with an input shaft I drivingly connected to the internal combustion engine 11 serving as a first source of driving force of the vehicle, the output shaft O drivingly connected to wheels 17, the rotary electric machine 12 serving as a second source of driving force of the vehicle, a torque converter 14 and a speed change mechanism 15 serving as the transmission device 13, and an output differential gear unit 16. The hybrid drive apparatus 1 is also provided with the drive transmission member T that transmits driving forces of the rotary electric machine 12 and the internal combustion engine 11 to the torque converter 14, and the input clutch CT that connects and disconnects the driving force between the internal combustion engine 11 and the rotary electric machine 12. These structures are housed in a case 2. In the present embodiment, the drive transmission member T corresponds to an "input member" in the present invention, and the output shaft O corresponds to an "output member" in the present invention.

The internal combustion engine 11 is a device to take out power by being driven by combustion of fuel inside the engine. Various known engines, such as a gasoline engine and a diesel engine, can be used as the internal combustion engine 11. Although not shown here, the internal combustion engine 11 is provided with the intake valve for introducing a mixture of fuel and air supplied through an intake path, to a combustion chamber of the internal combustion engine 11, and the exhaust valve for discharging burned gas and unburned gas after the air-fuel mixture is burned, from the combustion chamber to an exhaust path. In the present embodiment, the intake valve and the exhaust valve correspond to "valve elements" in the present invention. In the present example, an internal combustion engine output shaft Eo such as a crankshaft of the internal combustion engine 11 is drivingly connected to the input shaft I via a damper D. The input shaft I is drivingly connected to the drive transmission member T via the input clutch CT, thus being selectively drivingly connected to the drive transmission member T by the input clutch CT. That is, the internal combustion engine 11 is drivingly connected to the drive transmission member T while the input clutch CT is engaged, and separated from the drive transmission member T while the input clutch CT is disengaged.

A starter 27 is provided adjacent to the internal combustion engine 11. The starter 27 is composed of a direct-current motor, etc., and electrically connected to a battery 21 serving as an electrical storage device. A capacitor or the like may also be suitably used as an electrical storage device. The starter 27 is driven by electric power supplied from the battery 21 while, for example, the internal combustion engine 11 is in the stopped state, and rotates the internal combustion engine output shaft Eo so as to start the internal combustion engine 11 during non-operation (including failure) of the rotary electric machine 12.

In the present embodiment, the vehicle equipped with the hybrid drive apparatus 1 is provided with the valve opening/closing phase adjusting mechanism 28 (represented as "VVT" in FIG. 1) for adjusting the opening/closing phase or phases of one or both of the intake valve and the exhaust valve provided in the internal combustion engine 11. The valve opening/closing phase adjusting mechanism 28 adjusts the opening/closing phase of the intake valve by adjusting a phase difference between the internal combustion engine output shaft Eo (crankshaft) and an intake valve camshaft for driving to open and close the intake valve. Here, the expression "phase difference between the internal combustion engine output shaft Eo and the intake valve camshaft" means a phase difference between the rotational phase of a particular location in the circumferential direction of the internal combustion engine output shaft Eo and the rotational phase of a location on the intake valve camshaft corresponding to the particular location. In the present embodiment, the valve opening/closing phase adjusting mechanism 28 adjusts, in the same way, the opening/closing phase of the exhaust valve by adjusting a phase difference between the internal combustion engine output shaft Eo (crankshaft) and an exhaust valve camshaft for driving to open and close the exhaust valve.

The valve opening/closing phase adjusting mechanism 28 has a driving-side rotational member synchronously rotating with the internal combustion engine output shaft Eo and a driven-side rotational member synchronously rotating with the intake valve camshaft, and is structured so as to be capable of adjusting the phase difference between the driving-side rotational member and the driven-side rotational member within a predetermined movable range. The opening phase and the closing phase of the intake valve can be advanced by advancing the phase of the driven-side rotational member relative to the driving-side rotational member, and consequently by advancing the phase of the intake valve camshaft relative to the internal combustion engine output shaft Eo. On the other hand, the opening phase and the closing phase of the intake valve can be retarded by retarding the phase of the driven-side rotational member relative to the driving-side rotational member, and consequently by retarding the phase of the intake valve camshaft relative to the internal combustion engine output shaft Eo. The valve opening/closing phase adjusting mechanism 28 is also structured so as to have the driving-side rotational member synchronously rotating with the internal combustion engine output shaft Eo and a driven-side rotational member synchronously rotating with the exhaust valve camshaft, and so as to be capable of adjusting the phase difference between the driving-side rotational member and the driven-side rotational member within a predetermined movable range. The opening phase and the closing phase of the exhaust valve can be advanced by advancing the phase of the driven-side rotational member relative to the driving-side rotational member, and consequently by advancing the phase of the exhaust valve camshaft relative to the internal combustion engine output shaft Eo. On the other hand, the opening phase and the closing phase of the exhaust valve can be retarded by retarding the phase of the driven-side rotational member relative to the driving-side rotational member, and consequently by retarding the phase of the exhaust valve camshaft relative to the internal combustion engine output shaft Eo. Here, the term "advance" means to displace a phase in the advancing direction, and the term "retard" means to displace a phase in the retarding direction.

In the present embodiment, the valve opening/closing phase adjusting mechanism 28 as described above is an electrically operated valve opening/closing phase adjusting mechanism. That is, the phase differences between the driving-side rotational member and the driven-side rotational member of the valve opening/closing phase adjusting mechanism 28 according to the present embodiment are adjusted not by the hydraulic pressure produced by the oil pump 22, but by a driving force produced by an electric motor 29. Therefore, the electric motor 29 is electrically connected to the battery 21. The electric motor 29 is driven by electric power supplied from the battery 21 to adjust the phase differences between the driving-side rotational member and the driven-side rotational member. In the present embodiment, because of adopting the electrically operated valve opening/closing phase adjusting mechanism 28 described above, the opening/closing phases of the intake valve and the exhaust valve can be adjusted even in cases where the rotational speed of the drive transmission member T is too low to sufficiently obtain the hydraulic pressure by the oil pump 22. Note that, in the present example, the opening/closing phase of the intake valve and the opening/closing phase of the exhaust valve are adjusted independently from each other.

The rotary electric machine 12 has a stator 12a fixed to the case 2, and a rotor 12b rotatably supported on the radially inside of the stator 12a. The rotary electric machine 12 can serve as a motor (electric motor) producing mechanical power by receiving electric power, and as a generator (electric generator) producing electric power by receiving mechanical power. Therefore, the rotary electric machine 12 is electrically connected with the battery 21. The rotary electric machine 12 operates in a power running mode by receiving electric power supplied from the battery 21, or charges the battery 21 by supplying thereto the electric power generated by driving force transmitted from the internal combustion engine 11 and the wheels 17. The rotor 12b of the rotary electric machine 12 is drivingly connected via the drive transmission member T to a pump impeller 14a of the torque converter 14 so as to rotate as a unit therewith. The rotor 12b of the rotary electric machine 12 is also drivingly connected via the drive transmission member T and the input clutch CT to the input shaft I and the internal combustion engine 11. The drive transmission member T is a cylindrical rotational member disposed between the rotary electric machine 12 and the torque converter 14 in the axial direction of the input shaft I.

The torque converter 14 composing a part of the transmission device 13 is a device that transmits the rotational speed of the drive transmission member T to an intermediate shaft M at a changed speed, and converts the torque of the drive transmission member T transmitted from one or both of the internal combustion engine 11 and the rotary electric machine 12 into a torque that is transmitted to the intermediate shaft M. The torque converter 14 has the pump impeller 14a drivingly connected to the rotor 12b of the rotary electric machine 12 and the drive transmission member T so as to rotate as a unit therewith, a turbine runner 14b drivingly connected to the intermediate shaft M so as to rotate as a unit therewith, and a stator 14c provided between the pump impeller 14a and the turbine runner 14b. The torque converter 14 can transmit, via oil filled therein, the torque between the pump impeller 14a serving as a driving-side rotational member and the turbine runner 14b serving as a driven-side rotational member. In that operation, the rotational speed of the drive transmission member T is reduced at a predetermined speed ratio, and the torque of the drive transmission member T is amplified at a torque ratio corresponding to the speed ratio. Then, the rotational speed and the torque are transmitted to the intermediate shaft M.

The torque converter 14 is provided with a lockup clutch CL. The lockup clutch CL serves as a friction engagement device for locking up the torque converter 14. The lockup clutch CL drivingly connects the pump impeller 14a and the turbine runner 14b so as to make them rotate as a unit, in order to increase power transmission efficiency by eliminating slip between the pump impeller 14a and the turbine runner 14b. That is, in the engaged state of the lockup clutch CL, the torque converter 14 transmits, without involving the oil inside thereof, the torque of one or both of the internal combustion engine 11 and the rotary electric machine 12 directly to the speed change mechanism 15 via only the drive transmission member T and the intermediate shaft M.

Figures 2, 3:
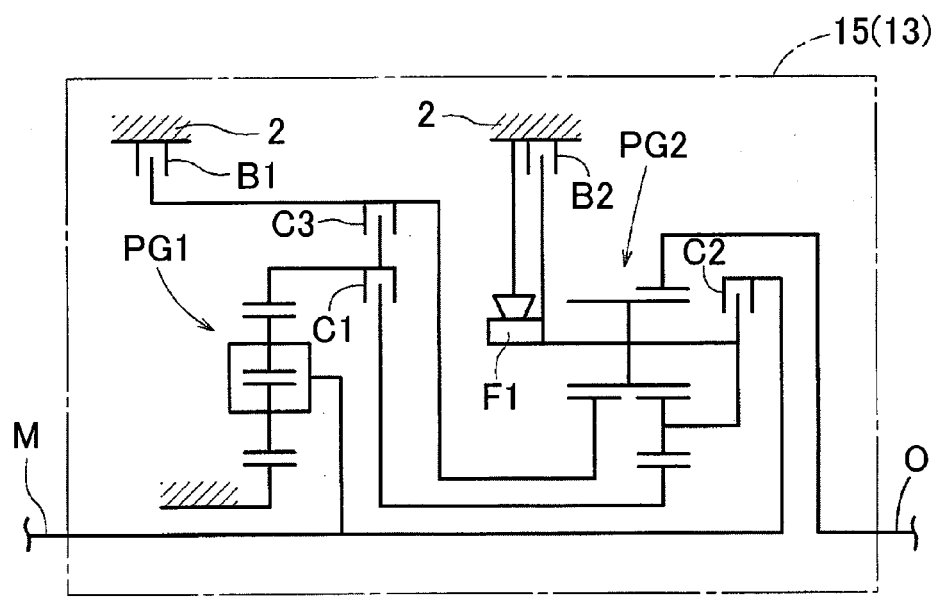
FIG. 2 is a schematic diagram showing a structure of a speed change mechanism according to the present embodiment.
FIG. 3 is an operation table showing operating states of a plurality of engagement elements at each shift speed according to the present embodiment.

The speed change mechanism 15 composing another part of the transmission device 13 is a device that changes the rotational speed of the intermediate shaft M at a predetermined speed ratio and transmits it to the output shaft O. In the present embodiment, as the speed change mechanism 15 as described above, a stepped automatic transmission is used that has a plurality of planetary gear mechanisms (a first planetary gear mechanism PG1 and a second planetary gear mechanism PG2) and a plurality of engagement elements (a first clutch C1, a second clutch C2, a third clutch C3, a first brake B1, a second brake B2, and a one-way clutch F1), as shown in FIG. 2. Here, in the present example, the clutches and the brakes, except the one-way clutch F1, are friction engagement elements such as wet-type multi-plate clutches. In the present embodiment, as shown in FIG. 3, by selectively engaging two of the plurality of engagement elements, a desired shift speed is established among a total of seven shift speeds including six forward speeds and one reverse speed provided in a switchable manner in the speed change mechanism 15. Although detailed description will be omitted here because the structure of the speed change mechanism 15 as described above has conventionally been known, in the present embodiment, as shown in FIG. 3, a first speed (1st) is established in the engaged state of the first clutch C1 and the one-way clutch F1. Note that the first speed (1st) is assumed as a shift speed for starting (starting shift speed) that is established when the vehicle in the stopped state starts. Therefore, in the present embodiment, the first clutch C1 corresponds to an "engagement element for starting" in the present invention.

The speed change mechanism 15 changes the rotational speed and converts the torque of the intermediate shaft M at the speed ratio of a shift speed established at each point of time, and transmits the changed speed and the converted torque to the output shaft O. The torque transmitted from the speed change mechanism 15 to the output shaft O is distributed and transmitted via the output differential gear unit 16 to the two right and left wheels 17. In the present embodiment, the input shaft I, the intermediate shaft M, and the output shaft O are coaxially arranged to form a single-axis structure. The drive transmission member T is arranged on the radially outside of the input shaft I, the intermediate shaft M, and the output shaft O in a coaxial manner therewith.

2. Structure of Hydraulic Control System

A hydraulic control system of the hybrid drive apparatus 1 will be described. As shown in FIG. 1, the hydraulic control system is provided with the mechanical oil pump 22 mechanically drivingly connected to the source of vehicle driving force as a hydraulic pressure source for sucking oil accumulated in an oil pan (not shown) to supply the oil to various parts of the hybrid drive apparatus 1. For example, a gear pump or a vane pump can suitably be used as the oil pump 22 as described above. In the present embodiment, an internal gear pump having an inner rotor and an outer rotor is used as the oil pump 22. In the present embodiment, the oil pump 22 is drivingly connected to the rotary electric machine 12 via the pump impeller 14a of the torque converter 14 and the drive transmission member T, and moreover, selectively drivingly connected to the internal combustion engine 11 by the input clutch CT. The inner rotor of the oil pump 22 is driven via the drive transmission member T by driving force of one or both of the internal combustion engine 11 and the rotary electric machine 12 serving as the sources of vehicle driving force, whereby the oil pump 22 discharges the oil. In order to reduce manufacturing cost, the hybrid drive apparatus 1 according to the present embodiment is provided with no hydraulic pressure source, such as an electric pump, that is operable independently from the sources of vehicle driving force.

The hydraulic control system is also provided with a hydraulic control device 23 for regulating the pressure of the oil supplied from the oil pump 22 to a predetermined pressure. Although detailed description is omitted here, the hydraulic control device 23 adjusts opening of one or two or more regulating valves based on signal pressures from linear solenoid valves for pressure regulation, thereby adjusting the amount of oil drained from the regulating valves to regulate the pressure of the oil to one or two or more predetermined pressure levels. The oil regulated to the predetermined pressure levels is supplied to the input clutch CT, the lockup clutch CL, the torque converter 14, and the plurality of engagement elements C1, C2, C3, B1, and B2 of the speed change mechanism 15, at respectively required pressure levels.

Here, in the present embodiment, the oil that is supplied from the hydraulic control device 23 into each of the cylinders provided in the input clutch CT, the lockup clutch CL, and the plurality of engagement elements C1, C2, C3, B1, and B2 in order to move, in the cylinders, pistons for pressing the plurality of friction materials against each other so as to frictionally engage them with each other will be called "hydraulic oil" for convenience of description. In addition, the oil that flows between the plurality of friction materials disposed on the side opposite to the cylinder (opposite-to-cylinder side) with respect to each of the pistons that are respectively provided in the input clutch CT, the lockup clutch CL, and the plurality of engagement elements C1, C2, C3, B1, and B2 in order to cool the plurality of friction materials or lubricate various bearings and gear mechanisms will be called "circulating oil" for convenience of description. Moreover, the hydraulic pressure of the hydraulic oil will be called "hydraulic oil pressure," and the hydraulic pressure of the circulating oil will be called "circulating oil pressure."

3. Specific Structure of Hybrid Drive Apparatus

Figure 4:
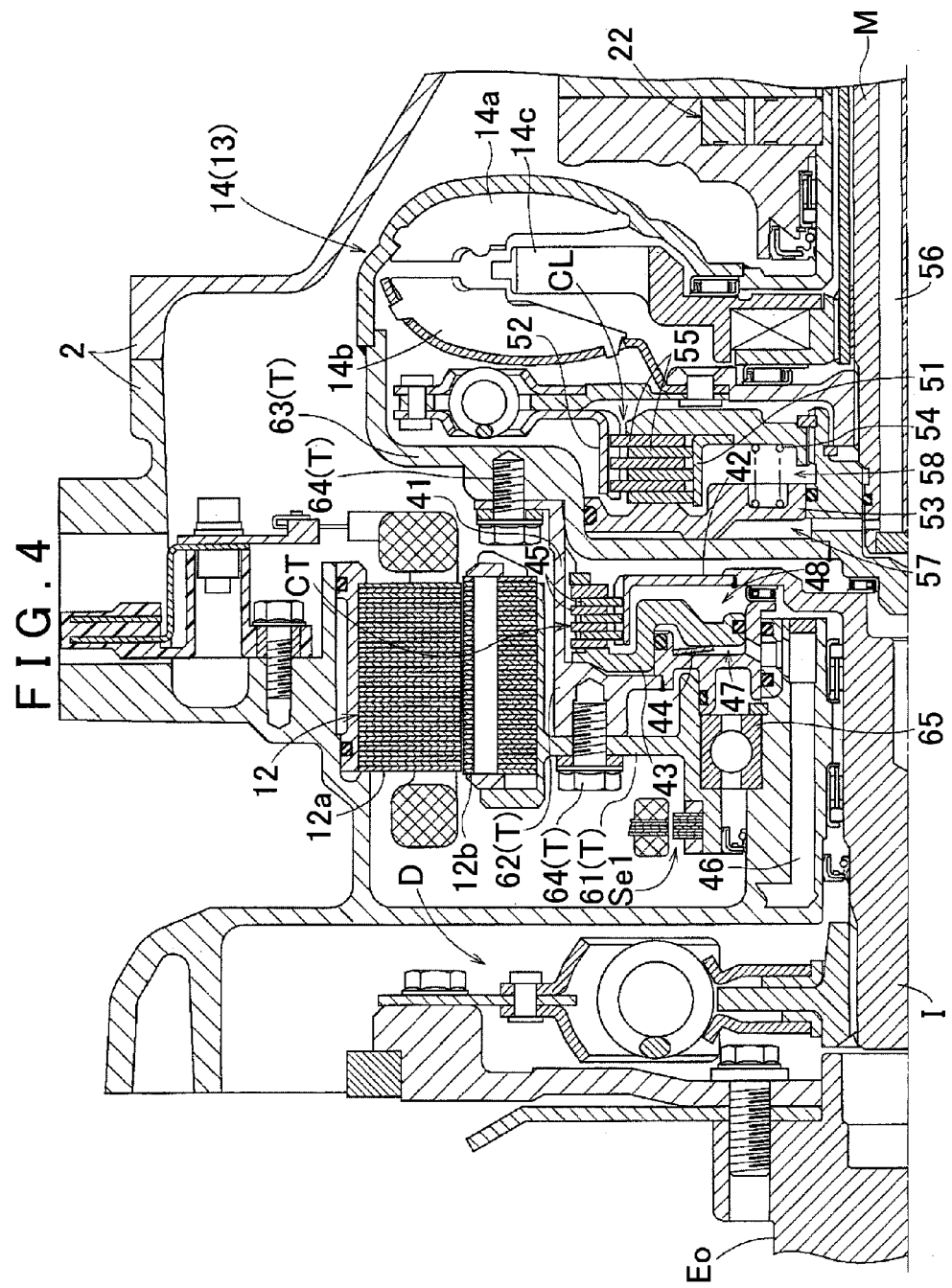
FIG. 4 is a partial cross sectional view of the hybrid drive apparatus according to the present embodiment.

Next, a specific structure of the hybrid drive apparatus 1 will be described. Here, the structure will be described, particularly focusing on various parts disposed on the power transmission path between the input shaft I and the intermediate shaft M. As shown in FIG. 4, the case 2 houses at least the input shaft I, the drive transmission member T, the rotary electric machine 12, the torque converter 14, the input clutch CT, the lockup clutch CL, and the intermediate shaft M.

The input shaft I and the intermediate shaft M are arranged side by side in the axial direction. The rotary electric machine 12 and the input clutch CT are disposed on the radially outside of the input shaft I that is on the internal combustion engine 11 side in the axial direction. The input clutch CT is disposed in a position radially inside and axially overlapping the rotary electric machine 12. In the present example, the whole of the input clutch CT is disposed so as to axially overlap the rotary electric machine 12. The torque converter 14 is disposed on the axially opposite side of the internal combustion engine 11 with respect to the rotary electric machine 12 and the input clutch CT. The torque converter 14 is disposed in a position radially outside of the intermediate shaft M and radially overlapping the rotary electric machine 12. The lockup clutch CL is disposed axially between: the rotary electric machine 12 and the input clutch CT; and the torque converter 14. The lockup clutch CL is disposed in a position radially overlapping the input clutch CT. Note that, here, the term "overlapping" with respect to two members in a certain direction means that each of the two members has, at least partially, a portion located in the same position as each other, with respect to arrangement in the certain direction.

The rotary electric machine 12 has a rotor support member 61 that is provided extending at least radially so as to support the rotor 12b. The rotor support member 61 has a radially extending annular plate-shaped portion and a cylindrical portion integrally formed on the radially outside of the annular plate-shaped portion. The rotor 12b is rotatably supported to the case 2 via a support bearing 65 disposed on the radially inside of the rotor support member 61. A rotor rotation sensor Se1 is provided axially between the case 2 and the rotor support member 61. In the present example, a resolver is used as the rotor rotation sensor Se1 thus provided.

The torque converter 14 has a torque converter support member 63 that is provided extending at least radially so as to support the torque converter 14. The torque converter support member 63 is a bowl-shaped member formed so as to cover the side axially closer to the internal combustion engine 11 than the torque converter 14, and, in the present example, structured as a stepped bowl-shaped member having a step in the radially central portion. The torque converter support member 63 is drivingly connected, at the end on the radially outside thereof, to the pump impeller 14a so as to rotate as a unit therewith. The rotor support member 61 and the torque converter support member 63 are drivingly connected via a connecting member 62 so as to rotate as a unit with each other. In the present example, fastening members 64 such as bolts are used for fixedly fastening both between the rotor support member 61 and the connecting member 62, and between the torque converter support member 63 and the connecting member 62, whereby these members are integrated into a unit. In the present embodiment, the "drive transmission member T" is structured by the rotor support member 61, the connecting member 62, the torque converter support member 63, and the fastening members 64.

The input clutch CT is a friction engagement device that selectively drivingly connects the internal combustion engine 11 and the rotary electric machine 12. In order to achieve such a function, the input clutch CT has the plurality of friction materials 45, a first piston 43 operated by hydraulic pressure to press the plurality of friction materials 45 against each other, and the coned disk spring 44 serving as an elastic member urging the first piston 43 at a predetermined urging force in the pressing direction, as shown in FIG. 4. Here, the term "pressing direction" is a direction in which the first piston 43 operated by hydraulic pressure acts so as to press the plurality of friction materials 45 against each other. In the present example, the pressing direction coincides with the direction from the internal combustion engine 11 toward the torque converter 14 in the axial direction of the input shaft I and the intermediate shaft M. The input clutch CT is provided with a first hub 42 that is connected to the input shaft I so as to rotate as a unit therewith, and a first drum 41 that is structured as a part of the connecting member 62 and drivingly connected to the rotary electric machine 12 and the pump impeller 14a so as to rotate as a unit therewith. The first drum 41 has a cylindrically formed portion, and the first piston 43 can move in the cylindrical portion. The plurality of friction materials 45 are retained so as to be restricted in rotation and to be axially slidable relative to each of the first drum 41 and the first hub 42. In addition, a liquid-tight first hydraulic oil chamber 47 is formed between the first drum 41 and the first piston 43, and the first hydraulic oil chamber 47 is supplied with hydraulic oil via a first supply oil passage 46 formed in the case 2. The coned disk spring 44 as an elastic member is disposed in the first hydraulic oil chamber 47, and the first piston 43 is urged in the pressing direction by the urging force of the coned disk spring 44 in the state in which the first hydraulic oil chamber 47 is supplied with no hydraulic oil. Therefore, the input clutch CT can transmit torque between the input shaft I and the drive transmission member T due to the urging force of the coned disk spring 44. Note that, also by supplying the hydraulic oil to the first hydraulic oil chamber 47, the plurality of friction materials 45 are frictionally engaged with each other by the hydraulic oil pressure, thereby enabling torque transmission via the input clutch CT. Moreover, on the side opposite to the first hydraulic oil chamber 47 (on the opposite-to-cylinder side, or on the side of the friction materials 45) with respect to the first piston 43, a first circulating oil chamber 48 for allowing the circulating oil to flow is formed.

In the present embodiment, the magnitude of the urging force of the coned disk spring 44 is set in advance so as to be within a predetermined range, in the state in which no hydraulic oil is supplied to the first hydraulic oil chamber 47 of the input clutch CT, and no circulating oil is supplied to the first circulating oil chamber 48. Here, the "magnitude within a predetermined range" refers to a range of a first limit threshold L1 or more and a second limit threshold L2 or less, to be described below.

In the present example, the first limit threshold L1 is defined as a lower limit value of the urging force (load) with which the torque of the internal combustion engine 11 can be transmitted to the oil pump 22 via the input clutch CT to drive the oil pump 22 from a stopped state, in the state in which neither the hydraulic oil pressure nor the circulating oil pressure is supplied. In the present embodiment, the first limit threshold L1 as described above is set based on an inertia torque of the rotary electric machine 12 and the torque converter 14, a loss torque by the oil pump 22, and a torque ripple by the rotary electric machine 12. The inertia torque of the rotary electric machine 12 and the torque converter 14 is a torque required to be supplied from outside for rotating, at a predetermined rotational speed, the rotor 12b of the rotary electric machine 12 and the pump impeller 14a of the torque converter 14 from a stopped state. The inertia torque is determined based on the inertia of the rotor 12b and the pump impeller 14a, a rotational speed thereof, and a drag time of the input clutch CT set in advance. The loss torque by the oil pump 22 is a torque required to be supplied from outside for driving the oil pump 22 against viscous resistance of oil filled therein. The loss torque changes with oil temperature and so forth. The torque ripple by the rotary electric machine 12 is an estimated pulsating component of a regenerative torque (load torque) by the rotary electric machine 12 driven by torque of the internal combustion engine 11. Then, the first limit threshold L1 is specified as an amount of the urging force (load) corresponding to a sum of the inertia torque of the rotary electric machine 12 and the torque converter 14, the loss torque by the oil pump 22, and the torque ripple by the rotary electric machine 12.

On the other hand, the second limit threshold L2 is defined as an upper limit value of the urging force (load) with which the internal combustion engine 11 in the stopped state can be maintained still in the stopped state even if the torque of the rotary electric machine 12 is transmitted to the internal combustion engine 11 via the input clutch CT, in the state in which neither the hydraulic oil pressure nor the circulating oil pressure is supplied. Here, the second limit threshold L2 is particularly set as the upper limit value in a state (most retarded phase state) in which the opening/closing phases of the intake valve and an exhaust valve provided in the internal combustion engine 11 are fully retarded within predetermined movable ranges. In the present embodiment, the second limit threshold L2 as described above is set based on a lower limit value of a torque (cranking torque) required to be supplied from outside for cranking the internal combustion engine output shaft Eo (crankshaft, etc.) of the internal combustion engine 11. Here, the cranking torque is determined based on an inertia torque of the internal combustion engine output shaft Eo, a slide resistance of rotation of the internal combustion engine output shaft Eo, and so forth. Then, the second limit threshold L2 is specified as a magnitude of the urging force (load) corresponding to the magnitude of the cranking torque.

The lockup clutch CL is a friction engagement device that selectively drivingly connects the pump impeller 14a and the turbine runner 14b of the torque converter 14. In order to achieve such a function, the lockup clutch CL is provided with a second drum 52 connected to the turbine runner 14b so as to rotate as a unit therewith, a second hub 51 connected to the torque converter support member 63 and the pump impeller 14a so as to rotate as a unit therewith, and a second piston 53, as shown in FIG. 4. The torque converter support member 63 connected to the second hub 51 has a cylindrically formed portion, and the second piston 53 can move in the cylindrical portion. The lockup clutch CL is also provided with a plurality of friction materials 55 that are retained so as to be restricted in rotation and to be axially slidable relative to each of the second hub 51 and the second drum 52. In addition, a liquid-tight second hydraulic oil chamber 57 is formed between the torque converter support member 63 and the second piston 53, and the second hydraulic oil chamber 57 is supplied with the hydraulic oil via a second supply oil passage 56 formed in the intermediate shaft M. Moreover, on the side opposite to the second hydraulic oil chamber 57 relative to the second piston 53, a second circulating oil chamber 58 for allowing the circulating oil to flow is formed. A return spring 54 is disposed in the second circulating oil chamber 58. In the state in which no hydraulic oil is supplied to the second hydraulic oil chamber 57, the second piston 53 is urged by an urging force of the return spring 54 toward the opposite side of the friction materials 55 (toward the cylinder side, or toward the side of the second hydraulic oil chamber 57). Then, by supplying the hydraulic oil to the second hydraulic oil chamber 57, the plurality of friction materials 55 are frictionally engaged with each other by the hydraulic oil pressure, thereby enabling torque transmission via the lockup clutch CL.

4. Structure of Control Unit

Figure 5:
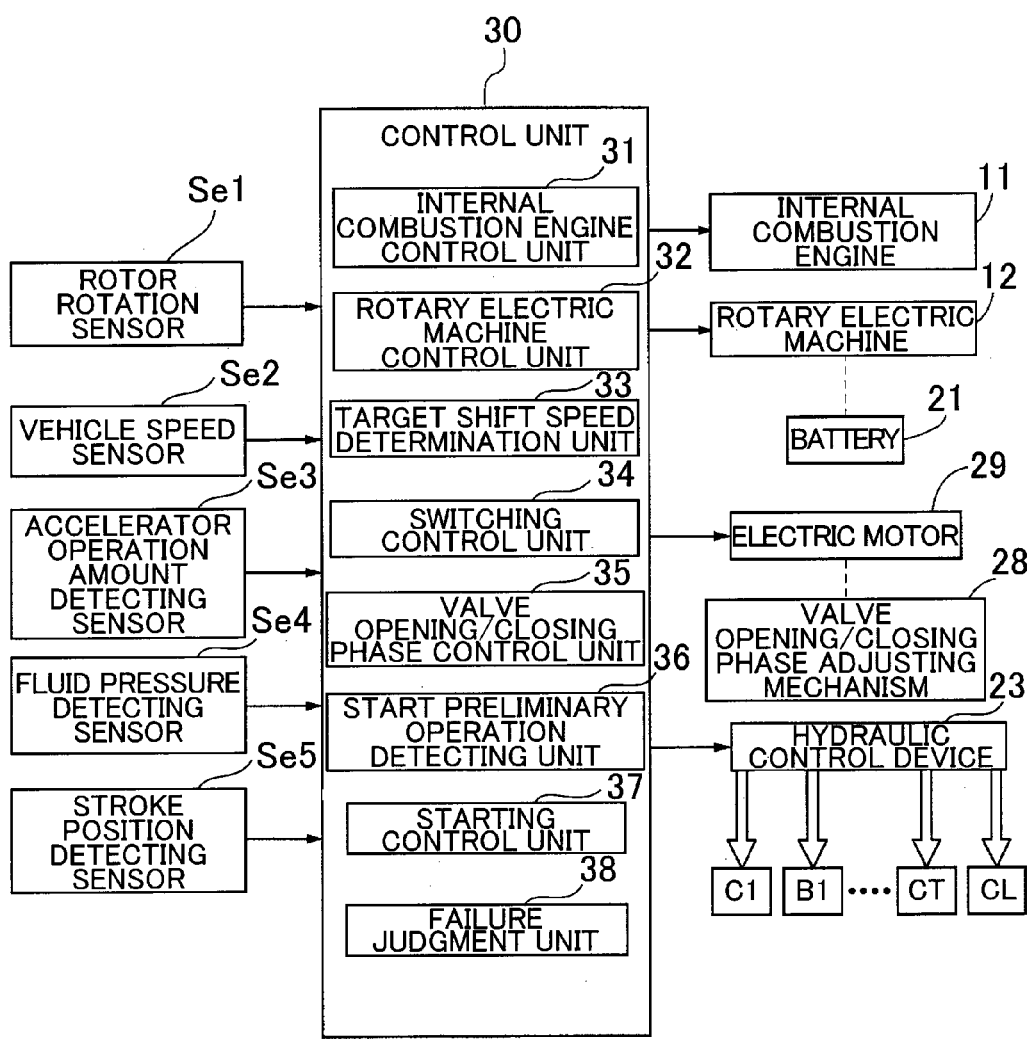
FIG. 5 is a block diagram showing a structure of a control unit according to the present embodiment.

Next, a structure of the control unit 30 according to the present embodiment will be described. As shown in FIG. 5, the control unit 30 functions as a core member to control operations of various parts of the hybrid drive apparatus 1. The control unit 30 is provided with, as a core member, an arithmetic processing unit such as a CPU, and has storage units such as a RAM (random access memory) from/to which data can be read/written by the arithmetic processing unit, a ROM (read-only memory) from which data can be read by the arithmetic processing unit, and so forth (not shown). Functional units 31 to 38 of the control unit 30 are structured by software (programs) stored in the ROM, etc., or hardware such as separately provided operational circuits, or the both. The functional units 31 to 38 are structured so as to be able to send/receive information to/from each other. In order to enable the functions by the functional units 31 to 38 to be appropriately achieved, the control unit 30 is also structured so as to be capable of obtaining information from a plurality of sensors Se1 to Se5 provided at various parts of the vehicle equipped with the hybrid drive apparatus 1. The functional units 31 to 38 of the control unit 30 will be described below in detail. Note that, in the present embodiment, the functional units 31 to 38 of the control unit 30 cooperate with each other to compose a "control device" in the present invention.

The rotor rotation sensor Se1 is a sensor that detects a rotational position of the rotor 12b relative to the stator 12a of the rotary electric machine 12. In the present example, the rotational speed of the rotor 12b is detected based on the information of the rotational position of the rotor 12b detected by the rotor rotation sensor Se1. In the present embodiment, because the rotor 12b of the rotary electric machine 12 and the inner rotor of the oil pump 22 are drivingly connected so as to rotate as a unit with each other via the drive transmission member T and the pump impeller 14a, the rotational speed detected by the rotor rotation sensor Se1 equals to the rotational speed of the inner rotor of the oil pump 22. A vehicle speed sensor Se2 is a sensor that detects a vehicle speed that is detected, in the present embodiment, by detecting a rotational speed of the output shaft O. An accelerator operation amount detecting sensor Se3 is a sensor that detects an accelerator operation amount by detecting an operation amount of an accelerator pedal (not shown). A fluid pressure detecting sensor Se4 is a sensor that detects a master cylinder fluid pressure obtained by a master cylinder 26 that operates in conjunction with a brake pedal 25, where the master cylinder fluid pressure can be assumed as an operation pressure of the brake pedal 25 included in a brake mechanism 24 (refer to FIG. 1) provided in the vehicle. A stroke position detecting sensor Se5 is a sensor that detects a stroke position of the brake pedal 25. In the present embodiment, the fluid pressure detecting sensor Se4 corresponds to an "operation pressure detecting portion" in the present invention, and the stroke position detecting sensor Se5 corresponds to a "stroke position detecting portion" in the present invention. The information indicating the results of detection by the sensors Se1 to Se5 is output to the control unit 30.

An internal combustion engine control unit 31 is a functional unit that controls operations of the internal combustion engine 11. The internal combustion engine control unit 31 functions as an internal combustion engine control section. The internal combustion engine control unit 31 determines an internal combustion engine operating point, and performs processing to control the internal combustion engine 11 so as to operate at the internal combustion engine operating point. Here, the internal combustion engine operating point is a control command value representing a control target point of the internal combustion engine 11, and defined by the rotational speed and the torque. More in detail, the internal combustion engine operating point is the command value representing the control target point of the internal combustion engine 11 determined by considering a vehicle required output and an optimal fuel consumption level, and is defined by a rotational speed command value and a torque command value. Then, the internal combustion engine control unit 31 controls the internal combustion engine 11 so as to operate at the torque and the rotational speed specified at the internal combustion engine operating point.

In the present embodiment, the internal combustion engine control unit 31 is structured so as to be capable of achieving a so-called idle-stop function that stops the internal combustion engine 11 by stopping fuel supply to the internal combustion engine 11 when a predetermined idle-stop condition is satisfied. During the idle stop, the internal combustion engine 11 is brought into the stopped state in the state in which the vehicle can run while the main source of electrical power is kept on. That is, the internal combustion engine 11 is brought into the stopped state while the vehicle is running, or the internal combustion engine 11 is brought into the stopped state while the vehicle is stopped. Here, the idle-stop condition is determined in advance based on the rotational speed of the internal combustion engine 11, the accelerator operation amount, the vehicle speed, and so forth. The internal combustion engine control unit 31 also performs control to start the internal combustion engine 11 by starting again the fuel supply to the internal combustion engine 11 when the idle-stop condition has become unsatisfied.

A rotary electric machine control unit 32 is a functional unit that controls operations of the rotary electric machine 12. The rotary electric machine control unit 32 functions as a rotary electric machine control section. The rotary electric machine control unit 32 determines a rotary electric machine operating point, and performs processing to control the rotary electric machine 12 so as to operate at the rotary electric machine operating point. Here, the rotary electric machine operating point is a control command value representing a control target point of the rotary electric machine 12, and defined by the rotational speed and the torque. More in detail, the rotary electric machine operating point is the command value representing the control target point of the rotary electric machine 12 determined by considering the vehicle required output and the internal combustion engine operating point, and is defined by a rotational speed command value and a torque command value. Then, the rotary electric machine control unit 32 controls the rotary electric machine 12 so as to operate at the torque and the rotational speed specified at the rotary electric machine operating point. The rotary electric machine control unit 32 also performs control for switching between the state in which the rotary electric machine 12 produces the driving force with electric power supplied from the battery 21 and the state in which the rotary electric machine 12 generates electric power with the rotational driving force of the internal combustion engine 11. Moreover, the rotary electric machine control unit 32 plays a part in vehicle starting operation control according to a command from a starting control unit 37 to be described later.

A target shift speed determination unit 33 is a functional unit that determines a target shift speed in the speed change mechanism 15. The target shift speed determination unit 33 functions as a target shift speed determination section. The target shift speed determination unit 33 determines the target shift speed based on the accelerator operation amount of the vehicle and the vehicle speed. Here, the information of the accelerator operation amount is obtained by detecting with the accelerator operation amount detecting sensor Se3, and the information of the vehicle speed is obtained by detecting with the vehicle speed sensor Se2. The control unit 30 has a predefined shift map stored in the memory (not shown) or the like. The shift map is a map in which shift schedules are set based on the accelerator operation amount and the vehicle speed. The target shift speed determination unit 33 determines the target shift speed to be established in the speed change mechanism 15 at each point of time, based on the shift map and on the accelerator operation amount and the speed of the vehicle.

A switching control unit 34 is a functional unit that performs control for switching the shift speed established in the speed change mechanism 15, in the case of a change in the target shift speed determined by the target shift speed determination unit 33.

The switching control unit 34 functions as a switching control section. The switching control unit 34 switches the shift speed established in the speed change mechanism 15 by controlling engagement and disengagement (release) of the engagement elements C1, C2, C3, B1, and B2 based on the target shift speed determined by the target shift speed determination unit 33. In the present embodiment, the switching control unit 34 performs control that supplies the hydraulic oil via the hydraulic control device 23 to two engagement elements (refer to FIG. 3) corresponding to the determined target shift speed to bring the engagement elements into an engaged state, thereby establishing the target shift speed. If the vehicle speed and the accelerator operation amount change, and thus, if the target shift speed determination unit 33 changes the target shift speed, the switching control unit 34 supplies the hydraulic oil to two engagement elements corresponding to the newly determined target shift speed to bring the engagement elements into an engaged state, thereby establishing the new target shift speed. The switching control unit 34 also performs control to disengage all of the engagement elements C1, C2, C3, B1, and B2 of the speed change mechanism 15 during the idle stop. Moreover, the switching control unit 34 plays a part in the vehicle starting operation control according to a command from the starting control unit 37 to be described later.

A valve opening/closing phase control unit 35 is a functional unit that controls to adjust the opening/closing phases of the intake valve and the exhaust valve of the internal combustion engine 11. The valve opening/closing phase control unit 35 functions as a valve opening/closing phase control section. The valve opening/closing phase control unit 35 controls, via the valve opening/closing phase adjusting mechanism 28, the opening/closing phases of the intake valve and the exhaust valve of the internal combustion engine 11 so as to be advanced or retarded within the predetermined movable ranges. Here, to "advance the opening/closing phase" means to make the opening time and the closing time of the intake valve (or exhaust valve) earlier by advancing the phase of the driven-side rotational member relative to the driving-side rotational member provided in the valve opening/closing phase adjusting mechanism 28. On the other hand, to "retard the opening/closing phase" means to make the opening time and the closing time of the intake valve (or exhaust valve) later by retarding the phase of the driven-side rotational member relative to the driving-side rotational member provided in the valve opening/closing phase adjusting mechanism 28. The valve opening/closing phase control unit 35 also performs, during normal running of the vehicle, normal running state phase control that adjusts the opening/closing phases of the intake valve and the exhaust valve so as to be appropriate phases within the movable ranges depending on the state of the internal combustion engine 11.

In the present embodiment, when the idle-stop condition is satisfied, the valve opening/closing phase control unit 35 controls the opening/closing phase of the intake valve of the internal combustion engine 11 so as to be a fully retarded phase (most retarded phase) within the movable range, via the valve opening/closing phase adjusting mechanism 28. As a result, a so-called decompression function is achieved by the valve opening/closing phase adjusting mechanism 28. When the decompression function is achieved, the pressure in a cylinder is relieved to be prevented from rising during compression stroke of the internal combustion engine 11, thereby suppressing pressure fluctuation in the cylinder to a low level. Consequently, occurrence of vibration can be suppressed when actually stopping the internal combustion engine 11 at the idle-stop time, or when starting again the internal combustion engine 11 from the stopped state thereof. In addition, an amount of energy required to start the internal combustion engine 11 can be reduced. Moreover, the valve opening/closing phase control unit 35 plays a part in the vehicle starting operation control according to a command from the starting control unit 37 to be described later.

A start preliminary operation detecting unit 36 is a functional unit that detects a predefined start preliminary operation by a driver while the vehicle is stopped. The start preliminary operation detecting unit 36 functions as a start preliminary operation detecting section. Here, the term "start preliminary operation" means a preliminary operation conducted by the vehicle driver for staring the vehicle in the stopped state, before actually starting the vehicle. In the present embodiment, the start preliminary operation detecting unit 36 detects, as the start preliminary operation, a releasing operation of the brake pedal 25 conducted by the driver before staring the vehicle in the stopped state. The start preliminary operation detecting unit 36 detects the start preliminary operation based on the master cylinder fluid pressure of the master cylinder 26 detected by the fluid pressure detecting sensor Se4. More specifically, the start preliminary operation detecting unit 36 judges to have detected the start preliminary operation when the master cylinder fluid pressure has decreased by a predetermined amount along with the releasing operation of the brake pedal 25. The "predetermined amount" in this case can be, for example, a fluid pressure corresponding to 20% to 50% of the master cylinder fluid pressure while the vehicle is stopped. In other words, the start preliminary operation detecting unit 36 judges to have detected the start preliminary operation, when the master cylinder fluid pressure has decreased to a first fluid pressure P1 corresponding to 50% to 80% of the master cylinder fluid pressure while the vehicle is stopped. The detection of the start preliminary operation serves as a trigger for the vehicle starting operation control to be described next.

In the present embodiment, in addition to the start preliminary operation by the driver, the start preliminary operation detecting unit 36 detects a predefined "time point immediately before end of start preliminary operation" that comes before the end of the start preliminary operation. In the present embodiment, in the same way as the detection of the start preliminary operation, the start preliminary operation detecting unit 36 detects the time point immediately before end of start preliminary operation based on the master cylinder fluid pressure of the master cylinder 26 detected by the fluid pressure detecting sensor Se4. More specifically, the start preliminary operation detecting unit 36 judges to have detected the time point immediately before end of start preliminary operation, when the master cylinder fluid pressure has further decreased by a predetermined amount after the detection of the start preliminary operation along with the releasing operation of the brake pedal 25. The "predetermined amount" in this case can be, for example, a fluid pressure corresponding to 70% to 90% of the master cylinder fluid pressure while the vehicle is stopped. In other words, the start preliminary operation detecting unit 36 judges to have detected the time point immediately before end of start preliminary operation, when the master cylinder fluid pressure has decreased to a second fluid pressure P2 corresponding to 10% to 30% of the master cylinder fluid pressure while the vehicle is stopped. When having detected the start preliminary operation or the time point immediately before end of start preliminary operation, the start preliminary operation detecting unit 36 outputs the information indicating the detection to the starting control unit 37, at any time.

The starting control unit 37 is a functional unit that controls the starting operation of the vehicle by cooperative control of the rotary electric machine control unit 32, the switching control unit 34, the valve opening/closing phase control unit 35, and so forth, when the start preliminary operation by the driver has been detected. The starting control unit 37 functions as a starting control section. The starting control unit 37 starts functioning by using as a trigger the detection of the start preliminary operation by the start preliminary operation detecting unit 36. That is, the starting control unit 37 does not function during normal running of the vehicle, and starts functioning only after receiving the information from the start preliminary operation detecting unit 36 indicating that the start preliminary operation has been detected. Note that, in the present embodiment, the starting control unit 37 controls the starting operation of the vehicle in different modes depending on whether the rotary electric machine 12 is in normal operation or abnormal operation. Details of the vehicle starting operation control by the starting control unit 37 will be described later.

A failure judgment unit 38 is a functional unit that judges the abnormal operation of the rotary electric machine 12. The failure judgment unit 38 functions as a failure judgment section. The failure judgment unit 38 judges that the rotary electric machine 12 is in abnormal operation, if the rotary electric machine 12 is not actually driven according to the rotary electric machine operating point determined by the rotary electric machine control unit 32. In the present embodiment, the failure judgment unit 38 particularly makes judgment as to non-operation of the rotary electric machine 12 as the abnormal operation thereof. Here, the expression "non-operation of rotary electric machine 12" means a state in which the rotary electric machine 12 produces no output even if the rotary electric machine control unit 32 has determined a certain rotary electric machine operating point. That is, the expression means a state in which the rotary electric machine 12 cannot produce a torque, and therefore, cannot rotate independently. The failure judgment unit 38 can be structured so as to judge the non-operation of the rotary electric machine 12 as described above, based on, for example, a current detection value by a current sensor (not shown) for detecting a current actually flowing through electrical wiring between the rotary electric machine 12 and an inverter device (not shown) electrically connected to the rotary electric machine 12. That is, the failure judgment unit 38 judges the rotary electric machine 12 to be in non-operation, if the current detection value should normally be a predetermined value (except zero) but is actually always zero. When having judged the rotary electric machine 12 to be in non-operation, the failure judgment unit 38 outputs the information indicating the judgment to the starting control unit 37.

5. Details of Vehicle Starting Operation Control

Next, detailed description will be made of the vehicle starting operation control performed mainly by the starting control unit 37 with cooperation of the rotary electric machine control unit 32, the switching control unit 34, the valve opening/closing phase control unit 35, and so forth in the control unit 30, with reference to the accompanying drawings. As described above, in the present embodiment, the starting operation control is performed in different modes depending on whether the rotary electric machine 12 is in normal operation or abnormal operation. The starting operation control during normal operation of the rotary electric machine 12 and the starting operation control during abnormal operation of the rotary electric machine 12 will be described below in this order.

Figure 6:
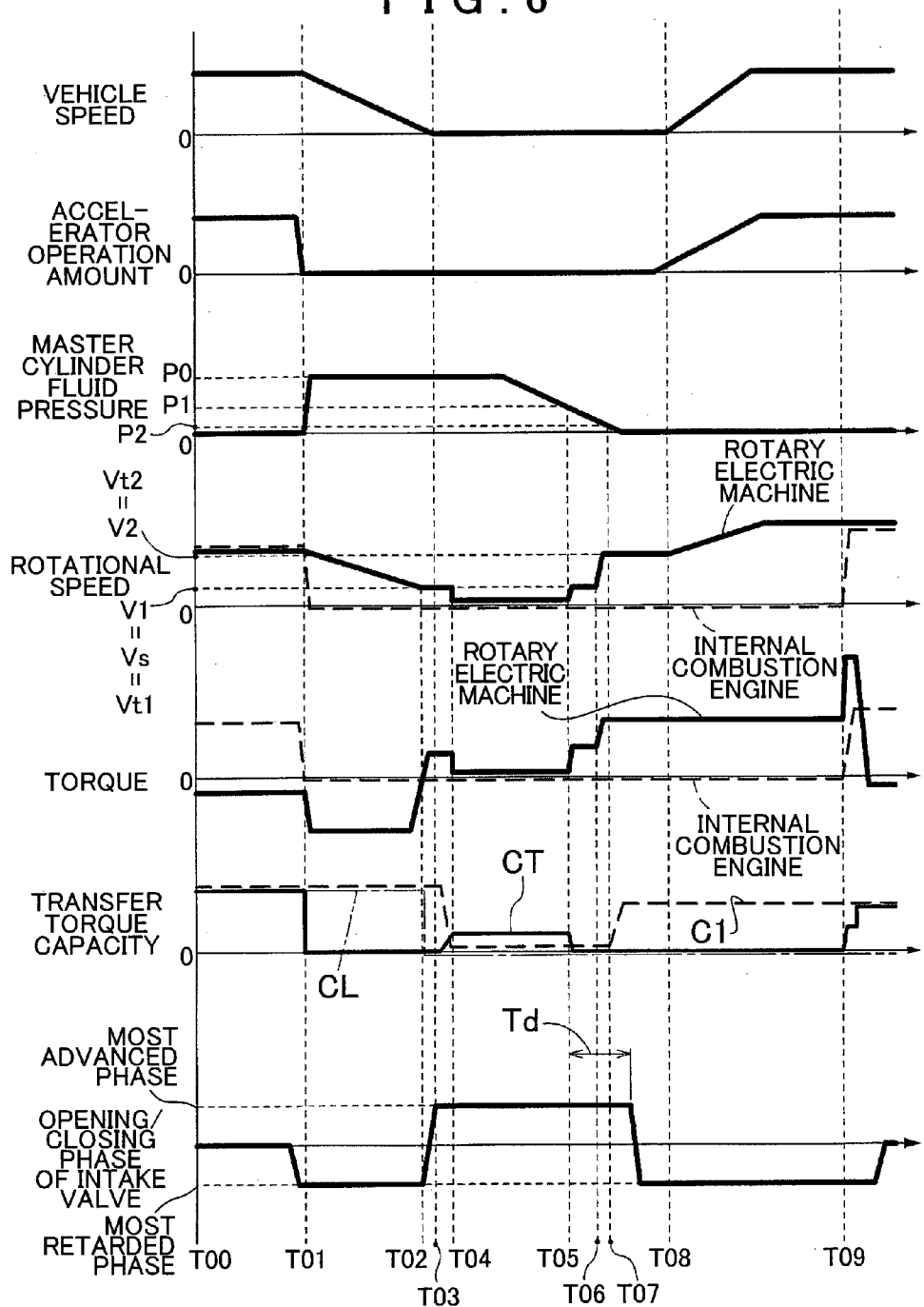
FIG. 6 is a timing chart showing an example of starting operation control during normal operation of a rotary electric machine according to the present embodiment.

5-1. Starting Operation Control During Normal Operation of Rotary Electric Machine First of all, the starting operation control during the normal operation of the rotary electric machine 12 will be described. FIG. 6 is a timing chart showing an example of the starting operation control during the normal operation of the rotary electric machine 12. FIG. 6 shows the vehicle speed, the accelerator operation amount, the master cylinder fluid pressure, the rotational speeds of the internal combustion engine 11 and the rotary electric machine 12, the torques of the internal combustion engine 11 and the rotary electric machine 12, transfer torque capacities of the clutches (input clutch CT, lockup clutch CL, and first clutch C1), and the opening/closing phase of the intake valve of the internal combustion engine 11, in this order from the top. As shown in this chart, during the normal operation of the rotary electric machine 12, when the start preliminary operation by the driver is detected while the vehicle is stopped with the internal combustion engine 11 in the stopped state, the control unit 30 rotates the rotary electric machine 12 to cause the oil pump 22 to produce the circulating oil pressure that cancels out the urging force of the coned disk spring 44 so as to disengage the input clutch CT, and, after disengaging the input clutch CT, engages the first clutch C1 provided in the transmission device 13 (speed change mechanism 15). Detailed description will be made below.

5-1-1. From Normal Running to Vehicle Stop

In the present example, the vehicle performs normal running by the torque of the internal combustion engine 11, in the state in which both of the input clutch CT and the lockup clutch CL are engaged, and the internal combustion engine 11, the rotary electric machine 12, and the pump impeller 14a and the turbine runner 14b of the torque converter 14 rotate as a unit with each other (time T00 to T01). In the present example, the rotary electric machine control unit 32 controls the torque of the rotary electric machine 12 such that a relatively small regenerative torque (negative torque) is output, and thus, the rotary electric machine 12 slightly generates electricity. The valve opening/closing phase control unit 35 performs the normal running state phase control that controls each of the opening/closing phases of the intake valve and the exhaust valve so as to be an appropriate phase between the most advanced phase and the most retarded phase depending on the state of the internal combustion engine 11.

When the accelerator pedal is released and the brake pedal 25 (refer to FIG. 1) is depressed at time T01, the rotary electric machine control unit 32 controls the torque of the rotary electric machine 12 such that a relatively large regenerative torque (negative torque) is output, and thus, the rotary electric machine 12 performs regenerative braking (time T01 to T02). Note that the regenerative braking as described above is performed in cooperation with braking operation by wheel brakes. During this time, the hydraulic control device 23 stops supplying the hydraulic oil pressure to the input clutch CT, and, as a result, the input clutch CT is brought into the disengaged state by the circulating oil pressure. In addition, the internal combustion engine control unit 31 stops supplying fuel to the internal combustion engine 11 to stop the internal combustion engine 11. In that operation, the valve opening/closing phase control unit 35 adjusts the opening/closing phase of the intake valve to the most retarded phase, before stopping the internal combustion engine 11. In the present embodiment, this most retarded phase is the "predetermined reference phase" in the present invention.

As the vehicle speed decreases, the rotational speed of the rotary electric machine 12 decreases to reach a disengagement threshold value Vs at time T02. Then, at that time, the valve opening/closing phase control unit 35 advances the opening/closing phase of the intake valve relative to the most retarded phase so as to be brought into the advanced phase state. In the present example, the valve opening/closing phase control unit 35 advances the opening/closing phase of the intake valve to the most advanced phase. Accordingly, the "advanced phase state" in the present example is a state in which the opening/closing phase of the intake valve is advanced to the most advanced phase. Here, the disengagement threshold value Vs as described above is set to a rotational speed of the inner rotor of the oil pump 22 required to produce the circulating oil pressure. The disengagement threshold value Vs as described above is set to, for example, 50 to 250 [rpm]. The rotary electric machine control unit 32 controls the rotational speed of the rotary electric machine 12 so as to be maintained at the disengagement threshold value Vs after time T02 (time T02 to T04). In the present embodiment, the inner rotor of the oil pump 22 is drivingly connected to the rotary electric machine 12 so as to rotate as a unit therewith via the pump impeller 14a of the torque converter 14 and the drive transmission member T. Therefore, by maintaining the rotational speed of the rotary electric machine 12 at the disengagement threshold value Vs, the rotational speed of the inner rotor of the oil pump 22 can be maintained at the disengagement threshold value Vs after time T02, thereby enabling to maintain the input clutch CT in the disengaged state with the circulating oil pressure produced by the oil pump 22. Note that the lockup clutch CL is disengaged at time T02.

When the vehicle stops completely at time T03, the switching control unit 34 stops supplying the hydraulic oil to all of the engagement elements including the first clutch C1 in the speed change mechanism 15 so as to bring all of the engagement elements into the disengaged state. In addition, the rotary electric machine control unit 32 controls the rotational speed of the rotary electric machine 12 to be zero, so as to stop the rotary electric machine 12 completely at time T04. Thereby, the vehicle is brought into the stopped state in the state in which the internal combustion engine 11 and the rotary electric machine 12 are stopped. In this state, the inner rotor of the oil pump 22 stops rotating, and thereby, the oil pump 22 stops discharging the oil. Consequently, in this state, with the plurality of friction materials 45 frictionally engaged with each other at the predetermined engaging pressure by only the urging force of the coned disk spring 44, the input clutch CT becomes capable of transmitting the torque. Note that, at this time, the hydraulic control device 23 supplies, to the first hydraulic oil chamber 47 of the input clutch CT, a hydraulic oil pressure that is approximately equal to and less than a stroke-end pressure of the first piston 43 of the input clutch CT on the assumption that the coned disk spring 44 is not provided. Note also that the brake pedal 25 is depressed by a large amount, thereby making the master cylinder fluid pressure at a maximum value P0.

5-1-2. From Vehicle Stop to Input Clutch Disengagement

While the vehicle is stopped, the start preliminary operation detecting unit 36 keeps monitoring the start preliminary operation by the driver. In the present embodiment, as described above, the start preliminary operation detecting unit 36 detects the start preliminary operation based on the master cylinder fluid pressure of the master cylinder 26 detected by the fluid pressure detecting sensor Se4. In the present example, the start preliminary operation detecting unit 36 judges to have detected the start preliminary operation by the driver, at time T05 when the master cylinder fluid pressure of the master cylinder 26 has decreased to the first fluid pressure P1 (P1=0.5*P0) corresponding to 50% of the master cylinder fluid pressure (P0) while the vehicle is stopped. When the start preliminary operation by the driver has been detected, the rotary electric machine control unit 32 controls the rotational speed of the rotary electric machine 12 so as to be a first target speed Vt1 (time T05 to T06). Here, the first target speed Vt1 has been set to the rotational speed of the inner rotor of the oil pump 22 required to produce the circulating oil pressure. The first target speed Vt1 as described above is set to, for example, 50 to 250 [rpm], in the same way as the disengagement threshold value Vs. In the present embodiment, the first target speed Vt1 and the disengagement threshold value Vs are set to the same value (V1) (Vs=Vt1=V1).

In the present embodiment, the inner rotor of the oil pump 22 is drivingly connected to the rotary electric machine 12 so as to rotate as a unit therewith via the pump impeller 14a of the torque converter 14 and the drive transmission member T. Therefore, by rotationally driving the rotary electric machine 12 at the first target speed Vt1, the inner rotor of the oil pump 22 can also be rotationally driven at the first target speed Vt1. Consequently, with the circulating oil pressure produced by the oil pump 22 and supplied to the first circulating oil chamber 48 on the opposite-to-cylinder side of the input clutch CT, the input clutch CT can be disengaged by canceling out the urging force of the coned disk spring 44 that is disposed in the first hydraulic oil chamber 47 so as to press the plurality of friction materials 45 against each other.

In this case, in the present embodiment, the amount of the urging force of the coned disk spring 44 in the state in which the first hydraulic oil chamber 47 of the input clutch CT is supplied with no hydraulic oil is set to an amount with which, in the most retarded phase state, the internal combustion engine 11 in the stopped state can be maintained still in the stopped state even if the torque of the rotary electric machine 12 is transmitted to the internal combustion engine 11 via the input clutch CT. That is, the amount of the urging force of the coned disk spring 44 is set so that the driven torque (such as the inertia torque of the internal combustion engine output shaft Eo, and the slide resistance of rotation of the internal combustion engine output shaft Eo) of the internal combustion engine 11 in the most retarded phase state is larger than the torque transmitted from the rotary electric machine 12 to the internal combustion engine 11 via the input clutch CT. Accordingly, when disengaging the input clutch CT by rotationally driving the rotary electric machine 12 to drive the oil pump 22, the internal combustion engine 11 can basically be maintained still in the stopped state even if a part of the torque of the rotary electric machine 12 is transmitted to the internal combustion engine 11 due to the urging force of the coned disk spring 44.

When taking into account that a certain amount of variations cannot be prevented from occurring in such factors as quality of the coned disk spring 44 and the driven torque of the drivingly connected internal combustion engine 11, it is not absolutely impossible that the internal combustion engine 11 is dragged to be rotated because the torque transmitted from the rotary electric machine 12 to the internal combustion engine 11 via the input clutch CT is larger than the driven torque of the internal combustion engine 11 when disengaging the input clutch CT by rotationally driving the rotary electric machine 12, even if the amount of the urging force of the coned disk spring 44 is set as described above. Therefore, in the present embodiment, after time T02 when the rotational speed of the rotary electric machine 12 has decreased to the disengagement threshold value Vs or less, the most advanced phase state is established in which the opening/closing phase of the intake valve is advanced to the most advanced phase, and in the most advanced phase state, the disengaging operation of the input clutch CT is performed by the circulating oil pressure produced by the oil pump 22 as described above. By establishing the most advanced phase state as described above, a pressure in the combustion chamber of the internal combustion engine 11 can be increased during compression operation in the combustion chamber. Therefore, the driven torque of the internal combustion engine 11 can be increased by a large amount compared with that in the most retarded phase state, and thus, the driven torque of the internal combustion engine 11 in the most advanced phase state can be surely larger than the torque transmittable by the input clutch CT with the urging force of the coned disk spring 44. Consequently, when disengaging the input clutch CT by rotationally driving the rotary electric machine 12, the internal combustion engine 11 can surely be maintained still in the stopped state while taking into account the variations in such factors as the quality of the coned disk spring 44 and the driven torque of the drivingly connected internal combustion engine 11.

5-1-3. From Input Clutch Disengagement to Vehicle Start

Then, after time T06, the rotary electric machine control unit 32 controls the rotational speed of the rotary electric machine 12 so as to be a second target speed Vt2 that is set to a larger value than the first target speed Vt1 (time T06 to T07). Here, the second target speed Vt2 is set to a rotational speed of the rotary electric machine 12 required for producing a creep torque when starting the vehicle. The second target speed Vt2 as described above is preferably set to, for example, 300 to 800 [rpm], and further preferably set to a rotational speed in the vicinity of an idle speed (V2) of the internal combustion engine 11. By rotationally driving the rotary electric machine 12 at the second target speed Vt2, the rotary electric machine 12 is brought into the state of producing the creep torque. However, at time T06, the brake pedal 25 is in the depressed state by the driver, and all of the engagement elements including the first clutch C1 in the speed change mechanism 15 are in the disengaged state. Therefore, the vehicle remains in the stopped state even though the rotary electric machine 12 produces the creep torque.

After detecting the start preliminary operation by the driver, the start preliminary operation detecting unit 36 keeps monitoring the time point immediately before end of start preliminary operation coming before the start preliminary operation ends. In the present embodiment, as described above, the start preliminary operation detecting unit 36 detects the time point immediately before end of start preliminary operation based on the master cylinder fluid pressure of the master cylinder 26 detected by the fluid pressure detecting sensor Se4. In the present example, the start preliminary operation detecting unit 36 judges to have detected the time point immediately before end of start preliminary operation at time T07 when the master cylinder fluid pressure of the master cylinder 26 has decreased to the second fluid pressure P2 (P2=0.1*P0) corresponding to 10% of the master cylinder fluid pressure (P0) while the vehicle is stopped. When the time point immediately before end of start preliminary operation is detected while the rotary electric machine 12 is producing the creep torque, the switching control unit 34 supplies the hydraulic oil to the first clutch C1 to engage the first clutch C1 before the start preliminary operation ends so as to bring the first clutch C1 into the engaged state. Note that, here, to "engage the first clutch C1 before the start preliminary operation ends" means to start an engaging operation of the first clutch C1 so as to start to have a torque capacity before the start preliminary operation ends, but does not necessarily mean to engage the first clutch C1 completely. In this operation, the switching control unit 34 controls the amount of the hydraulic oil pressure supplied to the first clutch C1 so that the torque capacity of the first clutch C1 is equal to or more than the amount of the creep torque produced by the rotary electric machine 12. Thereby, the creep torque produced by the rotary electric machine 12 can appropriately be transmitted to the side of the wheels 17 so as to start the vehicle appropriately.

In the present embodiment, in the state in which the input clutch CT is disengaged by the circulating oil pressure produced by the oil pump 22 that is driven by rotationally driving the rotary electric machine 12, the first clutch C1 is engaged to establish the first speed for starting, thereby starting the vehicle. Consequently, at time T08 when the vehicle actually begins starting, the input clutch CT is already in the disengaged state so that all of the creep torque produced by the rotary electric machine 12 is transmitted to the side of the wheels 17. Therefore, the torque transmitted to the side of the wheels 17 after the start of the vehicle is kept constant without changing by a large amount. Accordingly, the driveability can favorably be maintained when starting the vehicle.

In addition, in the present embodiment, the valve opening/closing phase control unit 35 retards the opening/closing phase of the intake valve of the internal combustion engine 11, after the disengagement of the input clutch CT. In the present example, the valve opening/closing phase control unit 35 retards the opening/closing phase of the intake valve that is at the most advanced phase level until reaching the most retarded phase level. More specifically, the valve opening/closing phase control unit 35 retards the opening/closing phase of the intake valve so as to reach the most retarded phase, at a time point when a predetermined delay time Td has passed from the time point (time T05) when the rotational speed of the rotary electric machine 12 detected by the rotor rotation sensor Se1 had increased to reach the first target speed Vt1. In this way, by waiting until the delay time Td further passes after the rotational speed of the rotary electric machine 12 has increased to reach the first target speed Vt1, the time when the opening/closing phase of the intake valve reaches the most retarded phase can be made to come after the input clutch CT has surely been brought into the disengaged state. Consequently, the disengaging operation of the input clutch CT can be performed in the state in which the driven torque of the internal combustion engine 11 is surely larger than the torque transmittable by the input clutch CT, and, after the disengagement of the input clutch CT, the decompression function is made achievable so as to be able to appropriately prepare for suppressing occurrence of vibration during the next starting of the internal combustion engine 11. Note that, in the present embodiment, the speed equal to the first target speed Vt1 (Vt1=V1) corresponds to a "disengagement threshold value" in the present invention at the upward stage of the rotational speed of the rotary electric machine 12. Therefore, in the present embodiment, the disengagement thresholds of the same value as each other are set for the downward stage and the upward stage of the rotational speed of the rotary electric machine 12.

5-1-4. From Vehicle Start to Normal Running

In the present embodiment, the vehicle is started in the electric drive mode in which only the rotary electric machine 12 produces torque while the internal combustion engine 11 is in the stopped state. In this operation, in the present example, the rotary electric machine control unit 32 controls the torque produced by the rotary electric machine 12 so as to correspond to a driving force required by the vehicle. Note that, the rotary electric machine control unit 32 can be structured to run the vehicle by appropriately switching between the stage to control the torque of the rotary electric machine 12 and the stage to control the rotational speed of the rotary electric machine 12, depending on the situation during the normal running after the start of the vehicle. Moreover, in the present example, the internal combustion engine 11 is started by cranking the internal combustion engine output shaft Eo at time T09. In this operation, the rotary electric machine control unit 32 temporarily adds a torque for cranking the internal combustion engine output shaft Eo to the torque corresponding to the driving force required by the vehicle, and, after the internal combustion engine 11 is started, controls the torque of the rotary electric machine 12 so as to be zero.

In this way, after the internal combustion engine 11 is started, the vehicle is driven in a parallel drive mode in which the vehicle is basically driven by the torque of the internal combustion engine 11, and, if the required driving force is not satisfied by only the torque of the internal combustion engine 11, the rotary electric machine 12 produces an assist torque.

In the present example, the lockup clutch CL is brought into the engaged state after the internal combustion engine 11 is started at time T09. Thereafter, the valve opening/closing phase control unit 35 performs the normal running state phase control.

Figure 7:
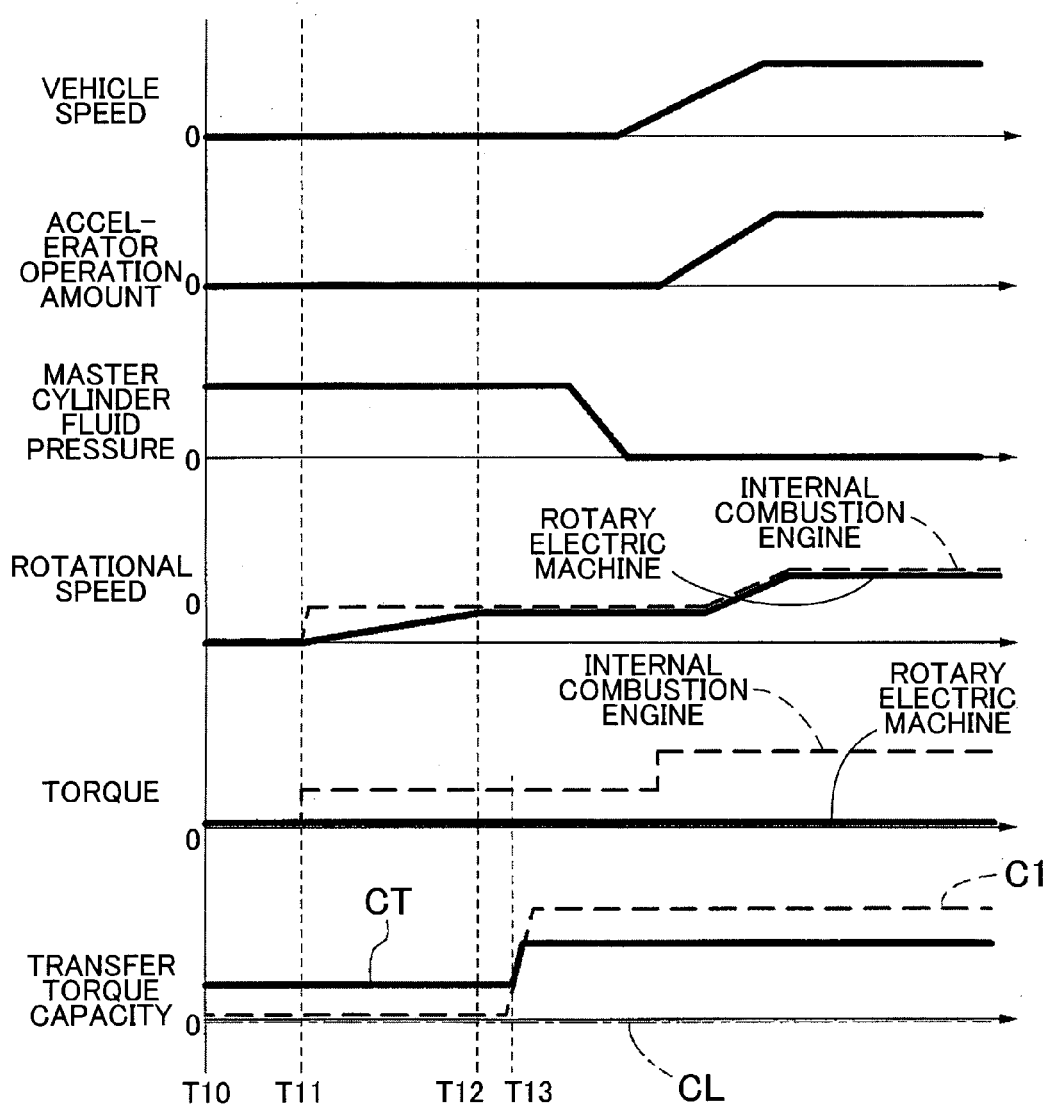
FIG. 7 is a timing chart showing an example of the starting operation control during abnormal operation of the rotary electric machine according to the present embodiment.

5-2. Starting Operation Control During Abnormal Operation of Rotary Electric Machine Next, the starting operation control during the abnormal operation of the rotary electric machine 12 will be described. FIG. 7 is a timing chart showing an example of the starting operation control during the abnormal operation of the rotary electric machine 12. FIG. 7 shows the vehicle speed, the accelerator operation amount, the master cylinder fluid pressure, the rotational speeds of the internal combustion engine 11 and the rotary electric machine 12, the torques of the internal combustion engine 11 and the rotary electric machine 12, and the transfer torque capacities of the clutches (input clutch CT, lockup clutch CL, and first clutch C1), in this order from the top. The opening/closing phase of the intake valve of the internal combustion engine 11 is omitted here. As shown in this chart, during the abnormal operation of the rotary electric machine 12, the control unit 30 starts the internal combustion engine 11, drives the oil pump 22 by transmitting the torque of the internal combustion engine 11 to the oil pump 22 via the input clutch CT with the plurality of friction materials 45 pressed against each other by the urging force of the coned disk spring 44, and engages the input clutch CT with the circulating oil pressure produced by the oil pump 22. Detailed description will be made below.

In the present example, the vehicle is stopped in the state in which both of the internal combustion engine 11 and the rotary electric machine 12 are stopped (time T10 to T11). All of the engagement elements including the lockup clutch CL and the first clutch C1 in the speed change mechanism 15 are in the disengaged state. The oil pump 22 is also in the stopped state. Accordingly, the oil pump 22 is not producing the circulating oil pressure, and therefore, the input clutch CT is capable of transmitting torque with the urging force of the coned disk spring 44. In this state, the internal combustion engine 11 is started by the starter 27 (refer to FIG. 1) at time T11, thereby starting to rotate at the idle speed and produce torque. Here, in the present embodiment, the magnitude of the urging force of the coned disk spring 44 in the state in which the first hydraulic oil chamber 47 of the input clutch CT is supplied with no hydraulic oil is set to a magnitude with which the torque of the internal combustion engine 11 can be transmitted to the inner rotor of the oil pump 22 via the input clutch CT, the drive transmission member T, and the pump impeller 14*a* of the torque converter 14. Consequently, a part, within a transmittable range by the input clutch CT (here, equal to a torque corresponding to the magnitude of the urging force of the coned disk spring 44), of the torque produced by the internal combustion engine 11 is transmitted to the side of the rotary electric machine 12 and the oil pump 22, and thereby, the rotational speed of the rotary electric machine 12 and the inner rotor of the oil pump 22 gradually rises toward the idle speed (time T11 to T12).

In this way, by raising the rotational speed of the inner rotor of the oil pump 22 with the torque of the internal combustion engine 11, the oil pump 22 can produce more hydraulic oil pressure. However, the oil pump 22 also produces a circulating oil pressure at the same time. Therefore, if the circulating oil pressure is supplied to the first circulating oil chamber 48 on the opposite-to-cylinder side of the input clutch CT, the input clutch CT is brought into the disengaged state so that the torque of the internal combustion engine 11 can not be transmitted to the side of the wheels 17. Therefore, during the abnormal operation of the rotary electric machine 12, control is performed, by controlling the hydraulic control device 23, to suppress the urging force of the coned disk spring 44 from being canceled out by the circulating oil pressure when performing the disengaging operation of the input clutch CT. More specifically, in the present embodiment, control is performed to reduce the circulating oil pressure supplied to the input clutch CT so as to be lower than the circulating oil pressure during the normal operation of the rotary electric machine 12. It may also be structured such that control is performed to supply the normal circulating oil pressure to the input clutch CT, and supply, to the first hydraulic oil chamber 47, a hydraulic oil pressure to cancel out the circulating oil pressure, or, in other words, a hydraulic oil pressure to assist the urging force of the coned disk spring 44. It may furthermore be structured such that control is performed in both of the above-described ways. Thus, the disengaging operation of the input clutch CT by the circulating oil pressure can be made to occur at least later than in the case of the normal operation of the rotary electric machine 12.

Thereafter, the internal combustion engine 11 and the rotary electric machine 12 are brought into the state of rotating at the same speed (here, the idle speed) at time T12, and then, at time T13, the hydraulic oil pressure produced by the oil pump 22 is supplied to the first hydraulic oil chamber 47 of the input clutch CT to bring the input clutch CT into the engaged state by the hydraulic oil pressure. That is, the input clutch CT is brought into the engaged state by the hydraulic oil pressure before it is brought into the disengaged state by the circulating oil pressure. Here, the oil pump 22 produces an oil pressure that engages the plurality of friction materials 45 of the input clutch CT so as to rotate completely as a unit with each other without mutually sliding, and thereby, engages the input clutch CT completely. After the input clutch CT is brought into the engaged state, the internal combustion engine 11 is prohibited from being stopped until the main source of vehicle electrical power is turned off. That is, the idle-stop function is stopped. According to the starting operation control as described above, the vehicle can appropriately be started and driven even if the rotary electric machine 12 is in failure.

6. Procedure of Vehicle Driving Control

Figure 8:
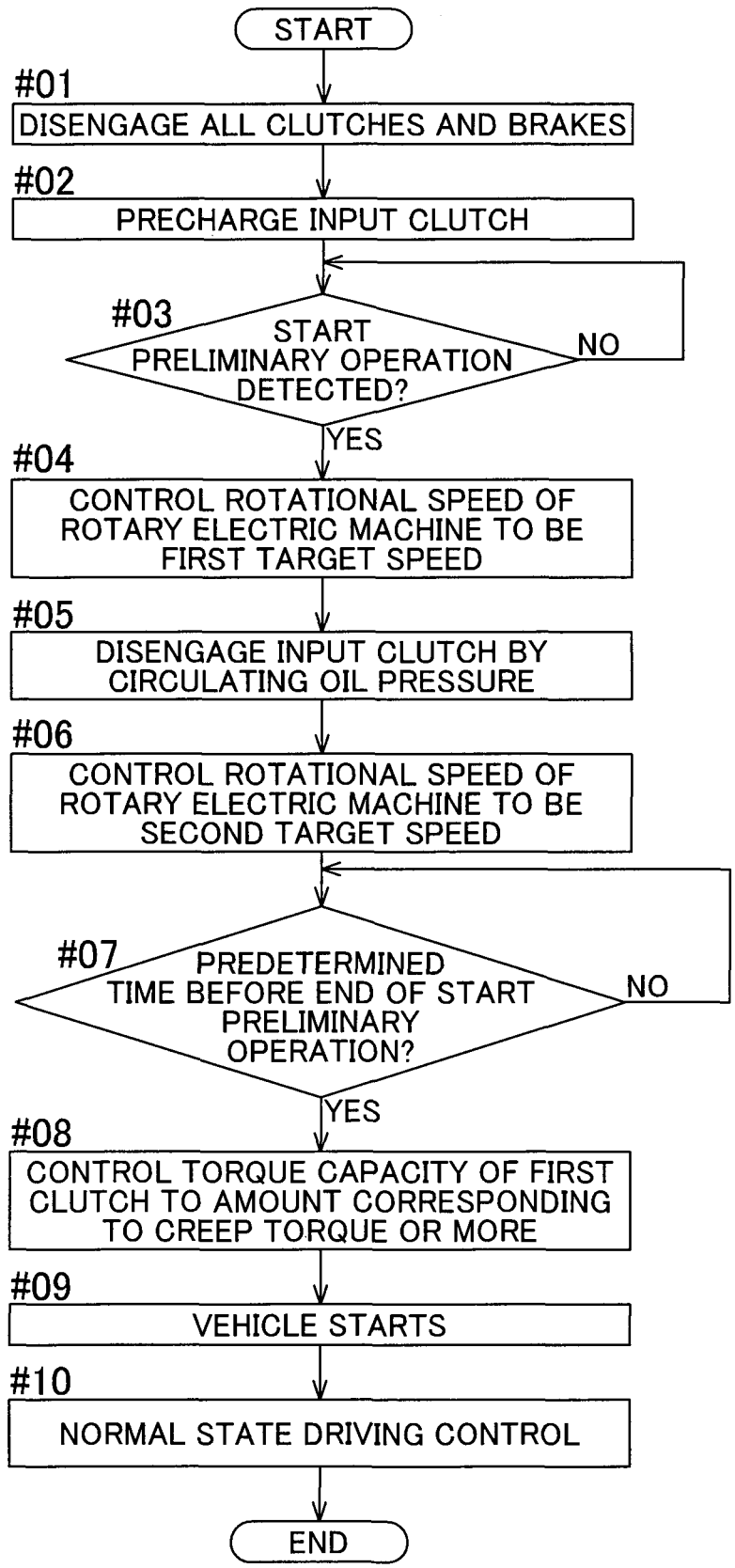
FIG. 8 is a flow chart showing a processing procedure of vehicle starting control according to the present embodiment.
Figure 9:
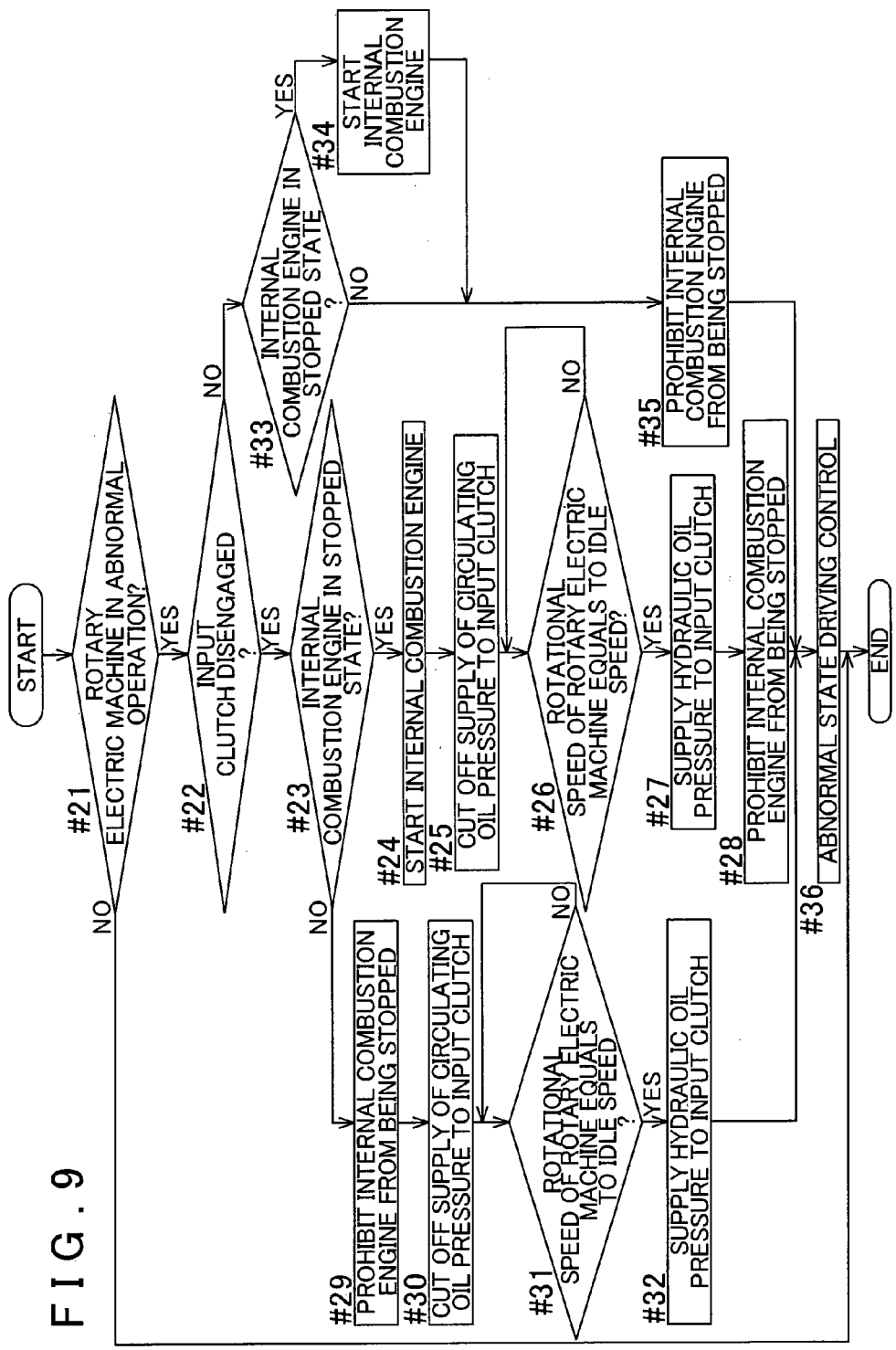
FIG. 9 is a flow chart showing a processing procedure of vehicle driving control during abnormal state of the rotary electric machine according to the present embodiment.
Figure 10:
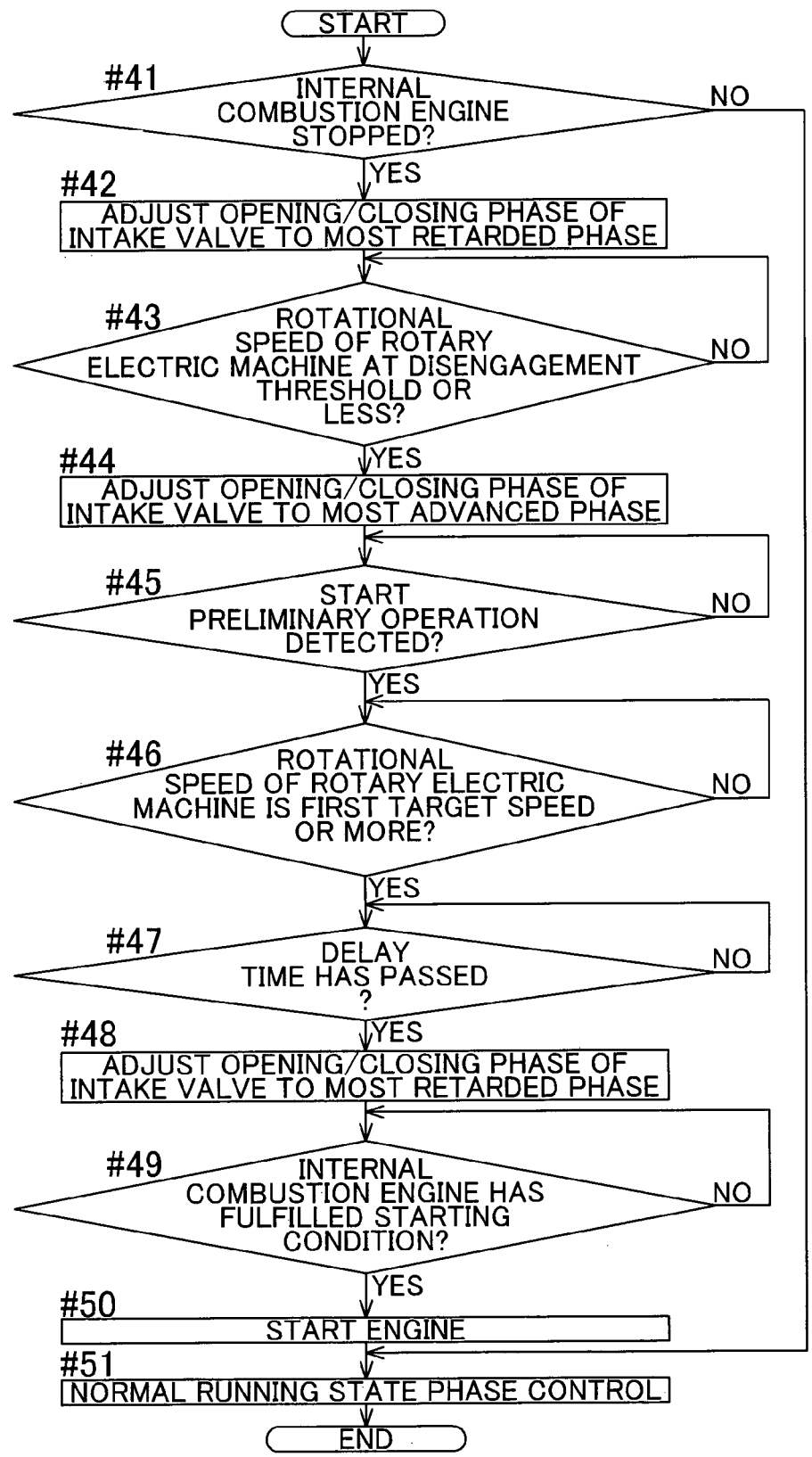
FIG. 10 is a flow chart showing a processing procedure of valve opening/closing phase control according to the present embodiment.

Next, the contents of control of the hybrid drive apparatus 1 according to the present embodiment will be described. FIG. 8 is a flow chart showing a processing procedure of the vehicle starting control (the starting operation control of the vehicle during the normal operation of the rotary electric machine 12) of the hybrid drive apparatus 1 according to the present embodiment. FIG. 9 is a flow chart showing a processing procedure of the vehicle driving control (including the starting operation control) during abnormal state of the rotary electric machine according to the present embodiment. FIG. 10 is a flow chart showing a processing procedure of the valve opening/closing phase control that is performed in parallel with the vehicle starting control shown in FIG. 8. The control processing procedures of the hybrid drive apparatus 1 described below are executed by the functional units 31 to 38 of the control unit 30. If the functional units 31 to 38 of the control unit 30 are constituted by programs, the arithmetic processing unit provided in the control unit 30 operates as a computer executing the programs constituting the functional units 31 to 38.

6-1. Procedure of Vehicle Starting Control

First of all, the processing procedure of the vehicle starting control according to the present embodiment will be described. The vehicle starting control is basically performed in the state in which the vehicle is stopped while the internal combustion engine 11 and the rotary electric machine 12 are stopped, in the case of the rotary electric machine 12 being not in abnormal operation. In the vehicle starting control, as shown in FIG. 8, the switching control unit 34 first brings all of the engagement elements C1, C2, C3, B1, and B2 of the speed change mechanism 15 into the disengaged state (step #01). The hydraulic control device 23 precharges the first hydraulic oil chamber 47 of the input clutch CT with the hydraulic oil pressure that is approximately equal to and less than the stroke-end pressure of the first piston 43 of the input clutch CT on the assumption that the coned disk spring 44 is not provided (step #02). In this state, the start preliminary operation detecting unit 36 keeps monitoring the predefined start preliminary operation by the driver (step #03). In the present example, the start preliminary operation detecting unit 36 judges to have detected the start preliminary operation, when the master cylinder fluid pressure has decreased to the first fluid pressure P1 corresponding to 50% to 80% of the master cylinder fluid pressure while the vehicle is stopped.

When the master cylinder fluid pressure detected by the fluid pressure detecting sensor Se4 decreases to the first fluid pressure P1, and thus, the start preliminary operation is detected (step #03: Yes), the rotary electric machine control unit 32 controls the rotational speed of the rotary electric machine 12 so as to be the first target speed Vt1 (step #04). Thereby, the inner rotor of the oil pump 22 drivingly connected via the drive transmission member T and the pump impeller 14a to the rotary electric machine 12 so as to rotate as a unit therewith is also rotationally driven at the first target speed Vt1. With the inner rotor rotating at the first target speed Vt1, the oil pump 22 produces the circulating oil pressure. The circulating oil pressure is supplied to the first circulating oil chamber 48 on the opposite-to-cylinder side of the input clutch CT, and disengages the input clutch CT by canceling out the urging force of the coned disk spring 44 disposed in the first hydraulic oil chamber 47 so as to press the plurality of friction materials 45 against each other (step #05). Thereafter, the rotary electric machine control unit 32 controls the rotational speed of the rotary electric machine 12 so as to be the second target speed Vt2 (step #06). Thereby, the rotary electric machine 12 is brought into the state of producing the creep torque.

After detecting the start preliminary operation, the start preliminary operation detecting unit 36 keeps monitoring the predefined time point immediately before end of start preliminary operation coming before the start preliminary operation ends (step #07). In the present example, the start preliminary operation detecting unit 36 judges to have reached the time point immediately before end of start preliminary operation, when the master cylinder fluid pressure has decreased to the second fluid pressure P2 corresponding to 10% to 30% of the master cylinder fluid pressure while the vehicle is stopped. When the master cylinder fluid pressure detected by the fluid pressure detecting sensor Se4 decreases to the second fluid pressure P2, and thus, the time point immediately before end of start preliminary operation is judged to be reached (step #07: Yes), the switching control unit 34 supplies the hydraulic oil to the first clutch C1 to bring the first clutch C1 into the engaged state. At this time, the torque capacity of the first clutch C1 is controlled so as to be equal to or more than the amount of the creep torque produced by the rotary electric machine 12 (step #08). When the brake operation is released in that state, the vehicle makes a start (step #09). Thereafter, the internal combustion engine control unit 31 and the rotary electric machine control unit 32 perform, in cooperation with each other, normal state driving control that drives the vehicle by controlling one or both of the internal combustion engine 11 and the rotary electric machine 12 depending on the vehicle running state (step #10). Thus, the vehicle starting control ends.

In the present embodiment, in the state, for example, in which the internal combustion engine 11 is stopped by the idle-stop function, and the vehicle is at a stage before stopping (at a stage earlier than the step #01), it is judged whether or not the rotational speed of the rotary electric machine 12 is less than the disengagement threshold value Vs. Then, if the rotational speed of the rotary electric machine 12 is judged to be less than the disengagement threshold value Vs, the rotary electric machine control unit 32 controls the rotational speed of the rotary electric machine 12 so as to be the disengagement threshold value Vs (here, equal to the first target speed Vt1). Thereby, the input clutch CT is maintained in the disengaged state until the vehicle stops completely.

6-2. Procedure of Vehicle Driving Control During Abnormal State of Rotary Electric Machine Next, the processing procedure of the vehicle driving control during the abnormal state of the rotary electric machine (including the starting operation control during the abnormal operation of the rotary electric machine 12, and hereinafter called "abnormal state vehicle driving control") according to the present embodiment will be described. In the abnormal state vehicle driving control, as shown in FIG. 9, the failure judgment unit 38 first judges whether or not the rotary electric machine 12 is in abnormal operation (step #21). In the present example, the failure judgment unit 38 particularly makes judgment as to non-operation of the rotary electric machine 12 as the abnormal operation thereof. If the rotary electric machine 12 is judged to be operating normally (step #21: No), the abnormal state vehicle driving control ends without further execution. On the other hand, if the rotary electric machine 12 is judged to be in abnormal operation (step #21: Yes), it is next judged whether or not the input clutch CT is in the disengaged state (step #22). If the input clutch CT is in the engaged state (step #22: No), it is then judged whether or not the internal combustion engine 11 is in the stopped state (step #33). If the internal combustion engine 11 is judged to be in the driving state (step #33: No), the idle-stop function is stopped in that state, and the internal combustion engine 11 is prohibited from being stopped (step #35). If the internal combustion engine 11 is in the stopped state (step #33: Yes), the internal combustion engine 11 is started by the starter 27 (step #34); then, the idle-stop function is stopped, and the internal combustion engine 11 is prohibited from being stopped (step #35). Thereafter, the internal combustion engine control unit 31 performs abnormal state driving control that drives the vehicle by controlling the internal combustion engine 11 depending on the vehicle running state (step #36), and then, the abnormal state vehicle driving control ends. Note that the abnormal state driving control described above is the same control as that of an internal combustion engine in a so-called common engine vehicle provided with only the internal combustion engine as a source of vehicle driving force.

In the judgment in the step #22, if the input clutch CT is in the disengaged state (step #22: Yes), it is then judged whether or not the internal combustion engine 11 is in the stopped state (step #23). If the internal combustion engine 11 is in the stopped state (step #23: Yes), the internal combustion engine 11 is started by the starter 27 (step #24). Next, the hydraulic control device 23 reduces the circulating oil pressure supplied to the input clutch CT so as to be lower than the circulating oil pressure during the normal operation of the rotary electric machine 12 (step #25). Next, it is judged whether or not the rotational speed of the rotor 12b of the rotary electric machine 12 driven by the torque of the internal combustion engine 11 transmitted via the input clutch CT has reached a value approximately equal to the idle speed of the internal combustion engine 11 (step #26). If the rotational speed of the rotary electric machine 12 is approximately equal to the idle speed (step #26: Yes), the hydraulic control device 23 supplies the hydraulic oil to the first hydraulic oil chamber 47 of the input clutch CT (step #27), thus bringing the input clutch CT into the engaged state by the hydraulic oil pressure. Thereafter, the idle-stop function is stopped, and the internal combustion engine 11 is prohibited from being stopped (step #28); then, the abnormal state driving control is performed (step #36), and the abnormal state vehicle driving control ends.

In the judgment in the step #23, if the internal combustion engine 11 is judged to be in the driving state (step #23: No), first of all, the idle-stop function is stopped, and the internal combustion engine 11 is prohibited from being stopped (step #29). Thereafter, the hydraulic control device 23 reduces the circulating oil pressure supplied to the input clutch CT so as to be lower than the circulating oil pressure during the normal operation of the rotary electric machine 12 (step #30). Next, it is judged whether or not the rotational speed of the rotor 12b of the rotary electric machine 12 driven by the torque of the internal combustion engine 11 via the input clutch CT has reached a value approximately, equal to the idle speed of the internal combustion engine 11 (step #31). If the rotational speed of the rotary electric machine 12 is approximately equal to the idle speed (step #31: Yes), the hydraulic oil is supplied to the first hydraulic oil chamber 47 of the input clutch CT (step #32), thus bringing the input clutch CT into the engaged state by the hydraulic oil pressure. Thereafter, the abnormal state driving control is performed (step #36), and then, the abnormal state vehicle driving control ends.

6-3. Procedure of Valve Opening/Closing Phase Control

Next, the processing procedure of the valve opening/closing phase control according to the present embodiment will be described. In the valve opening/closing phase control, as shown in FIG. 10, it is first judged whether or not the internal combustion engine 11 is stopped (step #41). If the internal combustion engine 11 is judged to maintain the driving state (step #41: No), the valve opening/closing phase control unit 35 performs the normal running state phase control that adjusts each of the opening/closing phases of the intake valve and the exhaust valve between the most advanced phase and the most retarded phase depending on the state of the internal combustion engine 11 (step #51), and then, terminates the valve opening/closing phase control. On the other hand, if the internal combustion engine 11 stops (step #41: Yes), the valve opening/closing phase control unit 35 adjusts the opening/closing phase of the intake valve of the internal combustion engine 11 to the most retarded phase (step #42). If the rotational speed of the rotary electric machine 12 has decreased and then reaches the disengagement threshold value Vs or less (step #43: Yes), the valve opening/closing phase control unit 35 adjusts the opening/closing phase of the intake valve of the internal combustion engine 11 to the most advanced phase (step #44).

In this state, the above-described vehicle starting control according to the present embodiment is performed. That is, the control is performed such that the predefined start preliminary operation by the driver is monitored by the start preliminary operation detecting unit 36 (step #45), and using as a trigger the detection of the start preliminary operation by the driver (step #45: Yes), the rotary electric machine 12 is rotated to disengage the input clutch CT by canceling out the urging force of the coned disk spring 44 with the circulating oil pressure produced by the oil pump 22. During rising of the rotational speed of the rotary electric machine 12 associated with the execution of the vehicle starting control, it is judged whether or not the rotational speed of the rotary electric machine 12 is the first target speed Vt1 or more (step #46). In the present example, the first target speed Vt1 is set to the same value as the disengagement threshold value Vs (Vt1=Vs=V1). When the rotational speed of the rotary electric machine 12 reaches the first target speed Vt1 or more (step #46: Yes), it is judged whether or not the predetermined delay time Td has passed from the time point when the first target speed Vt1 is reached (step #47). Then, after the delay time Td has passed (step #47: Yes), the valve opening/closing phase control unit 35 adjusts the opening/closing phase of the intake valve of the internal combustion engine 11 to the most retarded phase (step #48), for preparing for the start of the internal combustion engine 11. Then, after the internal combustion engine 11 has fulfilled a predetermined starting condition (step #49: Yes), the internal combustion engine 11 is started (step #50). Thereafter, the valve opening/closing phase control unit 35 performs the normal running state phase control (step #51), and then, terminates the valve opening/closing phase control.

Other Embodiments

Finally, other embodiments of the hybrid drive apparatus according to the present invention will be described. Note that each characteristic structure disclosed in each embodiment below is not applied only to that embodiment, but can be applied in combination with characteristic structures disclosed in other embodiments, unless any inconsistency arises.

(1) The above embodiment has been described by way of an example in which, in the starting operation control, the valve opening/closing phase control unit 35 advances the opening/closing phase of the intake valve to the most advanced phase while the vehicle is stopped. However, embodiments of the present invention are not limited to this. That is, it may be structured such that the valve opening/closing phase control unit 35 advances the opening/closing phase of the intake valve to an arbitrary phase between the most retarded phase and the most advanced phase, provided that the opening/closing phase of the intake valve is at least more advanced than the most retarded phase serving as the predetermined reference phase. Even in this case, the driven torque of the internal combustion engine 11 can be at least larger than the driven torque at the most retarded phase. Therefore, when disengaging the input clutch CT by rotationally driving the rotary electric machine 12, the internal combustion engine 11 can more surely be maintained still in the stopped state. Accordingly, the driveability can favorably be maintained when starting the vehicle.

(2) The above embodiment has been described by way of an example in which, assuming the fully retarded phase (most retarded phase) within the movable range of the opening/closing phase of the intake valve of the internal combustion engine 11 as the "reference phase," the valve opening/closing phase control unit 35 brings the opening/closing phase of the intake valve into the advanced phase state relative to the most retarded phase serving as the reference phase, in the starting operation control. However, embodiments of the present invention are not limited to this. That is, it is also one of preferred embodiments of the present invention to have a structure in which any phase (except the most advanced phase) between the most retarded phase and the most advanced phase can be set as the "reference phase," and, in the starting operation control, the valve opening/closing phase control unit 35 brings the opening/closing phase of the intake valve into the advanced phase state relative to the reference phase thus set. In this case, it is also one of preferred embodiments of the present invention, for example, to set, as the reference phase, a phase (such as a phase in the vicinity of a top dead center of the internal combustion engine 11) in an intermediate position between the most retarded phase and the most advanced phase.

(3) The above embodiment has been described by way of an example in which the valve opening/closing phase control unit 35 retards the opening/closing phase of the intake valve, at the time point when the predetermined delay time Td has passed from the time point when the rotational speed of the rotary electric machine 12 had increased to reach the first target speed Vt1. However, embodiments of the present invention are not limited to this. That is, it is also one of preferred embodiments of the present invention to have a structure in which, for example, at the time when the rotational speed of the rotary electric machine 12 has increased to reach the first target speed Vt1, the valve opening/closing phase control unit 35 immediately retards the opening/closing phase of the intake valve without waiting for the delay time Td to pass. For example, if factors such as the magnitude of the urging force of the coned disk spring 44 and the magnitude of the circulating oil pressure are highly controllable, and in an ideal state with almost no variations, the input clutch CT can almost surely be judged to be disengaged when the rotational speed of the rotary electric machine 12 has increased to reach the first target speed Vt1. Therefore, there is no particular problem even in a structure in which the delay time Td is not set.

(4) The above embodiment has been described by way of an example in which the disengagement thresholds equal to each other are set for the downward stage and the upward stage of the rotational speed of the rotary electric machine 12 (the disengagement threshold value Vs at the downward stage, and the speed equal to the first target speed Vt1 at the upward stage, that is, Vs=Vt1=V1). However, embodiments of the present invention are not limited to this. That is, it is also one of preferred embodiments of the present invention to have a structure in which different disengagement threshold values are set for the downward stage and the upward stage of the rotational speed of the rotary electric machine 12, provided that the rotational speed at each of the stages is sufficient to rotationally drive the inner rotor of the oil pump 22 so as to produce the circulating oil pressure for disengaging the input clutch CT.

(5) The above embodiment has been described by way of an example in which, in the starting operation control, the rotary electric machine control unit 32 controls the rotational speed of the rotary electric machine 12 so as to increase the rotational speed of the rotary electric machine 12 in a stepwise manner to speeds in the order of the first target speed Vt1 and the second target speed Vt2. However, embodiments of the present invention are not limited to this. That is, it is also one of preferred embodiments of the present invention to have a structure in which, for example, the rotary electric machine control unit 32 controls the rotational speed of the rotary electric machine 12 so as to adjust the rotational speed of the rotary electric machine 12 to the second target speed Vt2, immediately after the start preliminary operation by the driver is detected. Even in this case, at the time when the vehicle actually begins starting, the input clutch CT is already in the disengaged state, and thus, all of the creep torque produced by the rotary electric machine 12 is transmittable to the side of the wheels 17. Consequently, because the torque transmitted to the side of the wheels 17 after the start of the vehicle is kept constant without changing by a large amount, the driveability can favorably be maintained when starting the vehicle.

Figure 11:
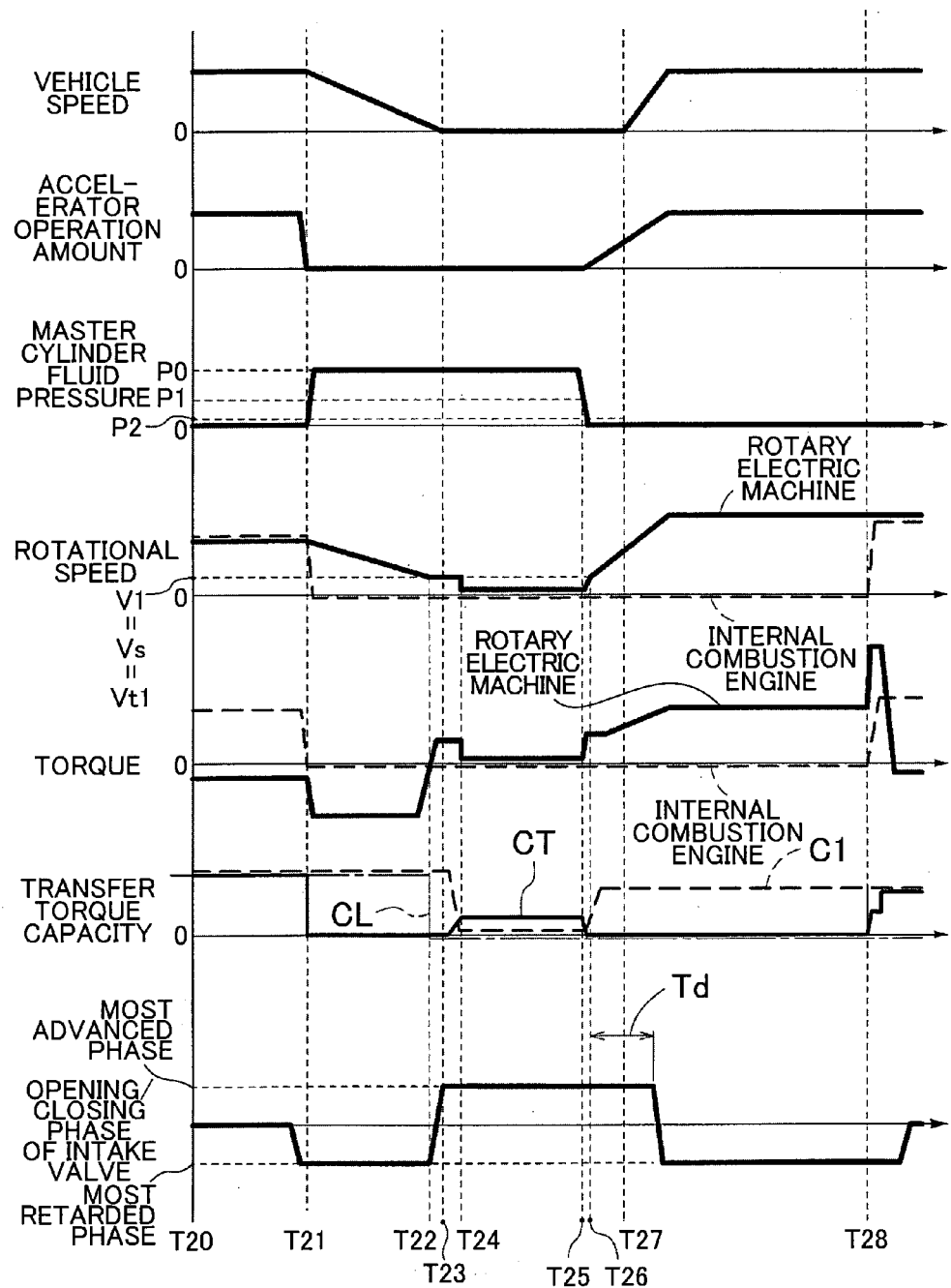
FIG. 11 is a timing chart showing an example of starting operation control during normal operation of the rotary electric machine according to another embodiment.

(6) The above embodiment has been described by way of an example in which the rotary electric machine control unit 32 controls the rotational speed of the rotary electric machine 12 so as to increase the rotational speed of the rotary electric machine 12 in a stepwise manner to speeds in the order of the first target speed Vt1 and the second target speed Vt2, before the vehicle actually starts in the starting operation control. However, embodiments of the present invention are not limited to this. That is, it is also one of preferred embodiments of the present invention to have a structure in which, in the starting operation control, the rotary electric machine control unit 32 controls the rotational speed of the rotary electric machine 12 so as to adjust the rotational speed of the rotary electric machine 12 to the first target speed Vt1, and, after the rotational speed of the rotary electric machine 12 is adjusted to the first target speed Vt1, the rotary electric machine control unit 32 controls the torque produced by the rotary electric machine 12 so as to correspond to a driving force required by the vehicle. FIG. 11 shows a timing chart in this case. As shown in FIG. 11, the structure as described above is preferable for the starting operation control in the case in which the releasing operation of the brake pedal 25 as the start preliminary operation by the driver is completed in a very short time, and immediately thereafter (or in parallel with the releasing operation of the brake pedal 25), a depressing operation of the accelerator pedal is performed. Also in this case, by starting the vehicle with the torque of the rotary electric machine 12 in the advanced phase state of the intake valve of the internal combustion engine 11, the internal combustion engine 11 can be maintained still in the stopped state when disengaging the input clutch CT by rotationally driving the rotary electric machine 12. Accordingly, the driveability can favorably be maintained when starting the vehicle.

(7) The above embodiment has been described by way of an example in which the start preliminary operation detecting unit 36 detects the start preliminary operation based on the master cylinder fluid pressure of the master cylinder 26 detected by the fluid pressure detecting sensor Se4. However, embodiments of the present invention are not limited to this. That is, the start preliminary operation can be structured to be detected based not necessarily on the master cylinder fluid pressure but on other operation pressure operating in conjunction with at least the brake pedal 25 included in the brake mechanism 24. It is also one of preferred embodiments of the present invention to have a structure in which, for example, the start preliminary operation detecting unit 36 detects the start preliminary operation based on the stroke position of the brake pedal 25 detected by the stroke position detecting sensor Se5. In this case, the start preliminary operation detecting unit 36 can be structured, for example, to judge to have detected the start preliminary operation when the stroke position of the brake pedal 25 has reached a predetermined position along with the releasing operation of the brake pedal 25. The start preliminary operation detecting unit 36 can also be structured, for example, to derive an amount of change in stroke associated with the releasing operation of the brake pedal 25 from the stroke position of the brake pedal 25 detected by the stroke position detecting sensor Se5, and then detect the start preliminary operation based on the amount of change in stroke. Moreover, it is also one of preferred embodiments of the present invention to have a structure in which the start preliminary operation is detected based on a combination of two or more of the plurality of indicators described above.

(8) The above embodiment has been described by way of an example in which the control unit 30 includes the internal combustion engine control unit 31, the rotary electric machine control unit 32, and the valve opening/closing phase control unit 35, and this single control unit 30 performs the operation control of the internal combustion engine 11, the operation control of the rotary electric machine 12, and the opening/closing phase adjustment control of the intake valve and the exhaust valve of the internal combustion engine 11 via the valve opening/closing phase adjusting mechanism 28. However, embodiments of the present invention are not limited to this. That is, it is also one of preferred embodiments of the present invention to have a structure in which one or two or more of these functional units are separated from the control unit 30 in the above embodiment, and included in other control units that are capable of operating in cooperation with the control unit 30. For example, a structure can be employed in which a control unit controlling the internal combustion engine 11, a control unit controlling the rotary electric machine 12, and a control unit controlling the valve opening/closing phase adjusting mechanism 28 are separately provided and operate in cooperation with each other. In this case, these control units cooperate with each other to compose the "control device" in the present invention.

(9) Regarding also other structures, the embodiments disclosed herein are examples in all respects, and embodiments of the present invention are not limited to these examples. That is, as far as including a structure described in the claims of the present application or a structure equivalent thereto, a structure obtained by appropriately changing a part of a structure not described in the claims also belongs to the technical scope of the present invention as a matter of course.

The present invention can preferably be used for a hybrid drive apparatus provided with an input member that is drivingly connected to a rotary electric machine and drivingly connected via an input clutch to an internal combustion engine, an output member that is drivingly connected to the input member and transmits rotation of the input member to wheels, and a control device that controls at least the rotary electric machine.

The invention claimed is:

1. A hybrid drive apparatus comprising:
an input member that is drivingly connected to a rotary electric machine and drivingly connected via an input clutch to an internal combustion engine;
an output member that is drivingly connected to the input member and transmits rotation of the input member to a wheel; and
a control device that controls at least the rotary electric machine, wherein
the input clutch has a plurality of friction materials and an elastic member pressing the plurality of friction materials against each other at a predetermined urging force, and is structured so as to be capable of transmitting torque by the urging force of the elastic member, and
the magnitude of the urging force of the elastic member and the opening/closing phases of the valve elements in the advanced phase state are set so that the torque transmittable by the input clutch with the urging force of the elastic member is smaller than the driven torque of the internal combustion engine in an advanced phase state; and
the control device is capable of performing valve opening/closing phase control for at least one of advancing and retarding opening/closing phases of valve elements provided in the internal combustion engine via a valve opening/closing phase adjusting mechanism, and, with the internal combustion engine in a stopped state before starting a vehicle, the control device advances the opening/closing phases of the valve elements to bring the opening/closing phases of the valve elements into the advanced phase state, thus starting the vehicle with torque of the rotary electric machine in the advanced phase state.

2. A hybrid drive apparatus comprising:
an input member that is drivingly' connected to a rotary electric machine and drivingly connected via an input clutch to an internal combustion engine;
an output member that is drivingly connected to the input member and transmits rotation of the input member to a wheel; and
a control device that controls at least the rotary electric machine, wherein
an oil pump that is driven by the input member is provided, and
the input clutch has a plurality of friction materials and an elastic member pressing the plurality of friction materials against each other at a predetermined urging force, and is structured so as to be capable of transmitting torque by the urging force of the elastic member, and
the input clutch further has a piston that presses the plurality of friction materials against each other by being operated by the urging force of the elastic, member and also by hydraulic pressure, and is structured such that a circulating oil pressure is supplied to an opposite-to-cylinder side of the piston,
the control device is capable of performing valve opening/closing phase control for advancing or retarding opening/closing phases of valve elements provided in the internal combustion engine via a valve opening/closing phase adjusting mechanism, and, with the internal combustion engine in a stopped state before starting a vehicle, the control device advances the opening/closing phases of the valve elements to bring the opening/closing phases of the valve elements into an advanced phase state relative to predetermined reference phases, thus starting the vehicle with torque of the rotary electric machine in the advanced phase state, and
the control device further, when detecting a start preliminary operation by a driver, rotates, the rotary electric machine to cause the oil pump to produce the circulating oil pressure that disengages the input clutch by canceling out the urging force of the elastic member, and retards the opening/closing phases of the valve elements after disengaging the input clutch.

3. The hybrid drive apparatus according to claim 2, wherein
a disengagement threshold value is set in advance as a lower limit value of the rotational speed of the rotary electric machine required to disengage the input clutch by the circulating oil pressure, and
the control device advances the opening/closing phases of the valve elements to bring the opening/closing phases of the valve elements into the advanced phase state when the rotational speed of the rotary electric machine has decreased to reach the disengagement threshold value, with the internal combustion engine in the stop state before stopping the vehicle.

4. The hybrid drive apparatus according to claim 2, wherein the magnitude of the urging force of the and the elastic member and the opening/closing phases of the valve elements in the advanced phase state are set so that the torque transmittable by the input clutch with the urging force of the elastic member is smaller than the driven torque of the internal combustion engine in the advanced phase state.

5. The hybrid drive apparatus according to claim 2, wherein
a disengagement threshold value is set in advance as a lower limit value of a rotational speed of the rotary electric machine required to disengage the input clutch by the circulating oil pressure, and
the control device retards the opening/closing phases of the valve elements when a predetermined delay time has further passed after the rotational speed of the rotary electric machine has increased to reach the disengagement threshold value.

6. The hybrid drive apparatus according to claim 2, wherein the magnitude of the urging force of the elastic member in the state of no, hydraulic pressure being supplied to the input clutch is set in advance to a magnitude within a range in which the internal combustion engine in the stopped state is capable of still remaining in the stopped state even if the torque of the rotary electric machine is transmitted via the input clutch to the internal combustion engine in a most retarded phase state in which the opening/closing phases of the valve elements arc fully retarded within predetermined movable ranges, and the torque of the internal combustion engine is capable of being transmitted via the input clutch to the oil pump to drive the oil pump from a stopped state.

7. The hybrid drive apparatus according to claim 2, wherein the magnitude of the urging force of the elastic member and the opening/closing phases of the valve elements in the advanced phase state are set so that the torque transmittable by the input clutch with the urging force of the elastic member is smaller than the driven torque of the internal combustion engine in the advanced phase state.

8. The hybrid drive apparatus according to claim 2, wherein
a disengagement threshold value is set in advance as a lower limit value of a rotational speed of the rotary electric machine required to disengage the input clutch by the circulating oil pressure, and
the control device retards opening/closing phases of the valve elements when a predetermined delay time has further passed after the rotational speed of the rotary electric machine has increased to reach the disengagement threshold value.

9. The hybrid drive apparatus according to claim 2, wherein the magnitude of the urging force of the elastic member in the state of no hydraulic pressure being supplied to the input clutch is set in advanced to a magnitude within a range in which the internal combustion engine in the stopped state is capable of still remaining in the stopped state even if the torque of the rotary electric machine is transmitted via the input clutch to the internal combustion engine in a most retarded phase state in which the opening/closing phases of the valve elements are fully retarded within predetermined movable ranges, and the torque of the internal combustion engine is capable of being transmitted via the input clutch to the oil pump to drive the oil pump from a stopped state.

10. A hybrid drive apparatus comprising:
an input member that is drivingly connected to, a rotary electric machine and drivingly connected via an in out clutch to an internal combustion engine;
an output member that is drivingly connected to the input member and transmits rotation of the input member to a wheel; and
a control device that controls at least the rotary electric machine, wherein
an oil pump that is driven by the input member is provided, and
the input clutch has a plurality of friction materials and an elastic member pressing the plurality of friction materials against each other at a predetermined urging force, and is structured so as to be capable of transmitting torque by the urging force of the elastic member, and the input clutch further has a piston that presses the plurality of friction materials against each other by being operated by the urging force of the elastic member and also by hydraulic pressure, and is structured such that a circulating oil pressure is supplied to an opposite-to-cylinder side of the piston, and a disengagement threshold value is set in advance as a lower limit value of the rotational speed of the rotary electric machine required to disengage the input clutch by the circulating oil pressure, and the control device is capable of performing valve opening/closing phase control for advancing or retarding opening/closing phases of valve elements provided in the internal combustion engine via a valve opening/closing phase adjusting mechanism, and, with the internal combustion engine in a stopped state before starting a vehicle, the control device advances the opening/closing phases of the valve elements to bring the opening/closing phases of the valve elements into an advanced phase state relative to predetermined reference phases, thus starting the vehicle with torque of the rotary electric machine in the advanced phase state, and the control device further advances the opening/closing phases of the valve elements to bring the opening/closing phases of the valve elements into the advanced phase state when the rotational speed of the rotary electric machine has decreased to reach the disengagement threshold value, with the internal combustion engine in the stopped state before stopping the vehicle, and the control device, when detecting a start preliminary operation by a driver while the vehicle is stopped with the internal combustion engine in the stopped state, rotates the rotary electric machine to cause the oil pump to produce the circulating oil pressure that disengages the input clutch by canceling out the urging force of the elastic member.

\* \* \* \* \*